United States Patent
Wang et al.

(10) Patent No.: US 11,483,561 B2
(45) Date of Patent: Oct. 25, 2022

(54) TRANSFORM METHOD IN PICTURE BLOCK ENCODING, INVERSE TRANSFORM METHOD IN PICTURE BLOCK DECODING, AND APPARATUS

(71) Applicants: Huawei Technologies Co., Ltd., Shenzhen (CN); TSINGHUA UNIVERSITY, Beijing (CN)

(72) Inventors: Liqiang Wang, Beijing (CN); Jianhua Zheng, Shenzhen (CN); Quanhe Yu, Beijing (CN); Yongbing Lin, Beijing (CN); Yun He, Beijing (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/037,192

(22) Filed: Sep. 29, 2020

(65) Prior Publication Data
US 2021/0014492 A1 Jan. 14, 2021

Related U.S. Application Data

(63) Continuation of application No. PCT/CN2018/124513, filed on Dec. 27, 2018.

(30) Foreign Application Priority Data

Mar. 31, 2018 (CN) .......................... 201810278488.2

(51) Int. Cl.
*H04N 19/12* (2014.01)
*H04N 19/119* (2014.01)
(Continued)

(52) U.S. Cl.
CPC ........... *H04N 19/12* (2014.11); *H04N 19/119* (2014.11); *H04N 19/167* (2014.11); *H04N 19/176* (2014.11); *H04N 19/70* (2014.11)

(58) Field of Classification Search
CPC .... H04N 19/12; H04N 19/119; H04N 19/167; H04N 19/176; H04N 19/70
See application file for complete search history.

(56) References Cited

U.S. PATENT DOCUMENTS

| | | | |
|---|---|---|---|
| 2012/0287989 A1 | 11/2012 | Budagavi et al. | |
| 2013/0003828 A1 | 1/2013 | Cohen et al. | |

(Continued)

FOREIGN PATENT DOCUMENTS

| | | |
|---|---|---|
| CN | 102484701 A | 5/2012 |
| CN | 102595116 A | 7/2012 |

(Continued)

OTHER PUBLICATIONS

An et al., "Non-CE7: Boundary-Dependent Transform for Inter-Predicted Residue," Joint Collaborative Team on Video Coding (JCT-VC) of ITU-T SG16 WP3 and ISO/IEC JTC1/SC29/WG11, 7th Meeting: Geneva, CH., JCTVC-G281, total 12 pages (Nov. 21-30, 2011).

(Continued)

*Primary Examiner* — Jonathan R Messmore
(74) *Attorney, Agent, or Firm* — Leydig, Voit & Mayer, Ltd.

(57) ABSTRACT

The present disclosure provide a transform method in picture block encoding, an inverse transform method in picture block decoding, and an apparatus. The inverse transform method includes: determining, in a target transform set, a corresponding transform pair of each region of at least two regions that constitute a to-be-decoded current block; inverse transforming each region based on the corresponding transform pair of each region to obtain an inverse transform result of each region; and obtaining an inverse transform result of the current block based on the inverse transform result of each region and a position of each region in the current block, where the at least two regions do not (Continued)

overlap each other, the target transform set includes a correspondence between a transform pair and a position of a region in the current block, and the transform pair includes a horizontal transform core and a vertical transform core.

20 Claims, 10 Drawing Sheets

(51) Int. Cl.
*H04N 19/167* (2014.01)
*H04N 19/176* (2014.01)
*H04N 19/70* (2014.01)

(56) References Cited

U.S. PATENT DOCUMENTS

| | | | | |
|---|---|---|---|---|
| 2013/0003855 | A1* | 1/2013 | Park | H04N 19/70 375/240.18 |
| 2017/0280162 | A1* | 9/2017 | Zhao | H04N 19/61 |
| 2018/0020218 | A1 | 1/2018 | Zhao et al. | |
| 2018/0115787 | A1* | 4/2018 | Koo | H04N 19/61 |
| 2018/0176601 | A1* | 6/2018 | Jeong | H04N 19/172 |

FOREIGN PATENT DOCUMENTS

| | | |
|---|---|---|
| CN | 102685487 A | 9/2012 |
| CN | 102792692 A | 11/2012 |
| CN | 105530518 A | 4/2016 |
| WO | 2017205700 A1 | 11/2017 |
| WO | 2018013953 A1 | 1/2018 |

OTHER PUBLICATIONS

Zhao et al., "Enhanced Multiple Transform for Video Coding," 2016 Data Compression Conference, IEEE, total 10 pages, Institute of Electrical and Electronics Engineers, New York, New York (Mar. 2016).

Wang et al., "Texture and Position Based Multiple Transform for Inter-Predicted Residue Coding," Proceedings, APSIPA Annual Summit and Conference 2018, total 6 pages, Hawaii (Nov. 12-15, 2018).

* cited by examiner

FIG. 8

TRANSFORM METHOD IN PICTURE BLOCK ENCODING, INVERSE TRANSFORM METHOD IN PICTURE BLOCK DECODING, AND APPARATUS

CROSS-REFERENCE TO RELATED DISCLOSURES

This application is a continuation of International Application No. PCT/CN2018/124513, filed on Dec. 27, 2018, which claims priority to Chinese Patent Application No. 201810278488.2, filed on Mar. 31, 2018. The disclosures of the aforementioned applications are hereby incorporated by reference in their entireties.

TECHNICAL FIELD

Embodiments of the present disclosure relate to the field of multimedia technologies, and in particular, to a transform method in picture block encoding, an inverse transform method in picture block decoding, and an apparatus.

BACKGROUND

In the field of multimedia technologies, video data can be efficiently transmitted and stored by using a video compression technology (including video data encoding and video data decoding).

Currently, in a video data encoding process, a video frame may be split into a plurality of coding tree units (coding tree unit, CTU). As shown in FIG. 1, each CTU may be split into a plurality of coding units (coding unit, CU) in a specific splitting (for example, quadtree splitting, binary tree splitting, or ternary tree splitting) manner. Then, a video encoding device may transform the plurality of CUs by using a multi-core transform technology, to complete encoding of the video data. For example, when one CU in the video frame is encoded, the coding block is transformed by using the multi-core transform technology (in the following, transforming a CU is to transform a residual block of the CU). Specifically, the CU may be separately transformed based on a plurality of transform pairs in a transform candidate set to obtain a plurality of transform results of the CU. Then, the video encoding device determines rate-distortion costs corresponding to the plurality of transform results, selects a transform pair with a minimum rate-distortion cost as a final transform pair of the CU, and determines an encoding result obtained based on the transform pair as a final encoding result of the CU.

However, in the foregoing method, on one hand, the video encoding device needs to determine the rate-distortion costs corresponding to the plurality of transform results, and determine the final transform pair of the CU based on the rate-distortion costs. Encoding the video data may be relatively complex. On the other hand, the video encoding device needs to add, to a bitstream, indication information used to indicate to select which transform pair in the transform candidate set. As a result, overheads required for encoding the video data are relatively large. In addition, for a CU with relatively rich texture information, the foregoing encoding method cannot maximize efficiency of encoding and decoding the video data.

SUMMARY

This disclosure provides a transform method in picture block encoding, an inverse transform method in picture block decoding, and an apparatus, to reduce complexity of encoding and decoding video data and improve efficiency of encoding and decoding the video data.

To achieve the foregoing objective, the following technical solutions are used in this disclosure:

According to a first aspect, an inverse transform method in picture block decoding is provided, and is applied to a video decoding device. The method includes: determining, in a target transform set, a corresponding transform pair of each region of at least two regions that constitute a to-be-decoded current block, where the at least two regions do not overlap each other, the target transform set includes a correspondence between a transform pair and a position of a region in the current block, and the transform pair includes a horizontal transform core and a vertical transform core; inverse transforming each region based on the corresponding transform pair of each region to obtain an inverse transform result of each region; and obtaining an inverse transform result of the current block based on the inverse transform result of each region and a position of each region in the current block.

According to the inverse transform method in picture block decoding provided in this disclosure, the video decoding device may determine, in the target transform set, the corresponding transform pair of each region of the at least two regions that constitute the to-be-decoded current block, inverse transform each region based on the corresponding transform pair of each region to obtain the inverse transform result of each region, and further obtain the inverse transform result of the current block based on the inverse transform result of each region and the position of each region in the current block. Compared with a prior-art method in which the current block is inverse transformed directly, the inverse transform method can improve efficiency of decoding video data, and improve quality of reconstructing a picture in the video data.

In a first optional implementation of the first aspect, the at least two regions are obtained in the following manner: performing N-layer partitioning on the current block based on a preset partitioning mode to obtain the at least two regions, where $1 \leq N \leq N1$, N1 is a maximum partitioning layer quantity, and the preset partitioning mode includes at least one of the following partitioning modes: a quadtree partitioning mode, a binary tree partitioning mode, or a ternary tree partitioning mode.

In this disclosure, the video decoding device may flexibly partition the current block by using one or more of the foregoing plurality of partitioning modes. In this way, region sizes can be diversified.

In a second optional implementation of the first aspect, before the determining, in a target transform set, a corresponding transform pair of each region of at least two regions that constitute a to-be-decoded current block, the inverse transform method in picture block decoding provided in this embodiment of the present disclosure further includes: determining the target transform set in a plurality of preset transform sets based on the partitioning mode and the partitioning layer quantity N that are of the current block.

In this disclosure, when the current block is partitioned by using different partitioning modes and different partitioning layer quantities, to obtain the at least two regions, the current block may correspond to different transform sets. In other words, there may be the plurality of preset transform sets for the current block. A video encoding device needs to determine the target transform set in the plurality of preset transform sets based on the partitioning mode and the partitioning layer quantity N that are of the current block, and then transform each region based on the corresponding transform pair of each region in the target transform set.

In a third optional implementation of the first aspect, before the determining, in a target transform set, a corresponding transform pair of each region of at least two regions that constitute a to-be-decoded current block, the inverse transform method in picture block decoding provided in this embodiment of the present disclosure further includes: determining the target transform set in a plurality of preset transform sets based on a prediction mode, the partitioning mode, and the partitioning layer quantity N that are of the current block.

In this disclosure, one to-be-encoded block may be encoded by using different prediction modes, and may be partitioned into at least two regions by using different partitioning modes and different partitioning layer quantities. For different prediction modes, different partitioning modes, and different partitioning layer quantities, the to-be-encoded block may correspond to different transform sets. In this way, there may be the plurality of preset transform sets for the current block. The video encoding device needs to determine the target transform set in the plurality of preset transform sets based on the prediction mode, the partitioning mode, and the partitioning layer quantity N that are of the current block, and then transform each region based on the corresponding transform pair of each region in the target transform set.

In a fourth optional implementation of the first aspect, a method for performing N-layer partitioning on the current block based on the preset partitioning mode to obtain the at least two regions may include: determining whether the current block meets a partitioning condition, where the partitioning condition is that a width of the current block is greater than a preset width threshold, or that a height of the current block is greater than a preset height threshold; and when determining that the current block meets the partitioning condition, performing N-layer partitioning on the current block based on the preset partitioning mode to obtain the at least two regions.

In a fifth optional implementation of the first aspect, a method for performing N-layer partitioning on the current block based on the preset partitioning mode to obtain the at least two regions may include: parsing a bitstream corresponding to a bitstream layer at which the current block is located, to obtain first transform indication information, where the first transform indication information is used to indicate whether the current block needs to be inverse transformed by region; and when the first transform indication information indicates that the current block needs to be inverse transformed by region, performing N-layer partitioning on the current block based on the preset partitioning mode to obtain the at least two regions.

In a sixth optional implementation of the first aspect, a method for parsing the bitstream corresponding to the bitstream layer at which the current block is located, to obtain the first transform indication information may include: parsing a bitstream corresponding to a sequence layer, a picture layer, or a slice layer at which the current block is located, to obtain second transform indication information, where the second transform indication information is used to indicate whether the sequence layer, the picture layer, or the slice layer includes a to-be-decoded block that needs to be inverse transformed by region; and when the second transform indication information indicates that the sequence layer, the picture layer, or the slice layer includes the to-be-decoded block that needs to be inverse transformed by region, parsing the bitstream corresponding to the bitstream layer at which the current block is located, to obtain the first transform indication information.

According to a second aspect, a transform method in picture block encoding is provided, and is applied to a video encoding device. The method includes: determining, in a target transform set, a corresponding transform pair of each region of at least two regions that constitute a to-be-encoded current block, where the at least two regions do not overlap each other, the target transform set includes a correspondence between a transform pair and a position of a region in the current block (in the second aspect and various optional implementations of the second aspect, the current block is the to-be-encoded current block), and the transform pair includes a horizontal transform core and a vertical transform core; transforming each region based on the corresponding transform pair of each region to obtain a transform result of each region; and obtaining a transform result of the current block based on the transform result of each region and a position of each region in the current block.

According to the transform method in picture block encoding provided in this disclosure, the video encoding device determines, in the target transform set, the corresponding transform pair of each region of the at least two regions that constitute the to-be-encoded current block, and may transform each region based on the corresponding transform pair of each region to obtain the transform result of each region, and further obtain the transform result of the current block based on the transform result of each region and the position of each region in the current block. The video encoding device no longer needs to determine a final transform manner of the current block based on a rate-distortion cost. This is different from an existing multi-core transform technology, and can reduce complexity of encoding video data, and improve efficiency of encoding the video data.

Further, the video encoding device no longer needs to write, into a bitstream, indication information used to indicate to select which transform pair in a transform candidate set. This is different from the multi-core transform technology, and can reduce overheads of encoding the video data.

Further, the video encoding device partitions the current block to obtain a plurality of regions, and transforms the current block by transforming each region based on a transform pair corresponding to a position of the region. This can better adapt to a distribution feature of picture texture information, and improve a compression effect of the video data.

In a first optional implementation of the second aspect, the at least two regions are obtained in the following manner: performing N-layer partitioning on the current block based on a preset partitioning mode to obtain the at least two regions, where $1 \le N \le N1$, N1 is a maximum partitioning layer quantity, and the preset partitioning mode includes at least one of the following partitioning modes: a quadtree partitioning mode, a binary tree partitioning mode, or a ternary tree partitioning mode.

In a second optional implementation of the second aspect, before the determining, in a target transform set, a corresponding transform pair of each region of at least two regions that constitute a to-be-encoded current block, the transform method in picture block encoding provided in this embodiment of the present disclosure further includes: determining the target transform set in a plurality of preset transform sets based on the partitioning mode and the partitioning layer quantity N that are of the current block.

In a third optional implementation of the second aspect, before the determining, in a target transform set, a corresponding transform pair of each region of at least two regions that constitute a to-be-decoded current block, the transform method in picture block encoding provided in this embodiment of the present disclosure further includes: determining the target transform set in a plurality of preset transform sets based on a prediction mode, the partitioning mode, and the partitioning layer quantity N that are of the current block.

In a fourth optional implementation of the second aspect, a method for performing N-layer partitioning on the current block based on the preset partitioning mode to obtain the at least two regions may include: determining whether the current block meets a partitioning condition, where the partitioning condition is that a width of the current block is greater than a preset width threshold, or that a height of the current block is greater than a preset height threshold; and when determining that the current block meets the partitioning condition, performing N-layer partitioning on the current block based on the preset partitioning mode to obtain the at least two regions.

In a fifth optional implementation of the second aspect, the transform method in picture block encoding provided in this embodiment of the present disclosure further includes: determining a first rate-distortion cost and a second rate-distortion cost, where the first rate-distortion cost is a rate-distortion cost of the current block when the current block is transformed by region to obtain the transform result of the current block, and the second rate-distortion cost is a rate-distortion cost of the current block when the current block is directly transformed to obtain the transform result of the current block; and determining transform indication information when the first rate-distortion cost is less than or equal to the second rate-distortion cost, where the transform indication information is used to indicate, to a video decoding device, that the current block needs to be inverse transformed by region.

In this disclosure, if the first rate-distortion cost is less than or equal to the second rate-distortion cost, the video encoding device may write first transform indication information into a bitstream corresponding to a bitstream layer at which the current block is located, to indicate, to the video decoding device, that the current block needs to be inverse transformed by region. In this way, the video decoding device may inverse transform the current block by region based on the transform indication information.

In an optional implementation, when encoding the video data, the video encoding device may further write second transform indication information into a bitstream corresponding to a sequence layer, a picture layer, or a slice layer of the video data. The second transform indication information is used to indicate, to the video decoding device, whether the sequence layer, the picture layer, or the slice layer of the video data includes a to-be-encoded block that needs to be transformed by region.

A video frame is used as an example. When the video encoding device determines that none of to-be-encoded blocks included in the video frame needs to be transformed by region, the video encoding device writes second transform indication information into a picture header of a picture layer corresponding to the video frame, to indicate that the picture layer does not include a to-be-encoded block that needs to be transformed by region. In this case, the video encoding device no longer needs to write the transform indication information into a bitstream corresponding to a bitstream layer at which each to-be-encoded block is located. This can reduce overheads required for encoding the video data.

For descriptions of technical effects of the optional implementations of the second aspect, refer to the descriptions of the technical effects of the optional implementations of the first aspect. Details are not described herein again.

According to a third aspect, a video decoding device is provided. The video decoding device includes a determining module and an inverse transform module. The determining module is configured to determine, in a target transform set, a corresponding transform pair of each region of at least two regions that constitute a to-be-decoded current block, where the at least two regions do not overlap each other, the target transform set includes a correspondence between a transform pair and a position of a region in the current block, and the transform pair includes a horizontal transform core and a vertical transform core. The inverse transform module is configured to: inverse transform each region based on the corresponding transform pair of each region to obtain an inverse transform result of each region, and obtain an inverse transform result of the current block based on the inverse transform result of each region and a position of each region in the current block.

In a first optional implementation of the third aspect, the video decoding device provided in this embodiment of the present disclosure further includes a partitioning module. The partitioning module is configured to perform N-layer partitioning on the current block based on a preset partitioning mode to obtain the at least two regions, where $1 \leq N \leq N1$, N1 is a maximum partitioning layer quantity, and the preset partitioning mode includes at least one of the following partitioning modes: a quadtree partitioning mode, a binary tree partitioning mode, or a ternary tree partitioning mode.

In a second optional implementation of the third aspect, the determining module is further configured to: before determining, in the target transform set, the corresponding transform pair of each region of the at least two regions that constitute the to-be-decoded current block, determine the target transform set in a plurality of preset transform sets based on the partitioning mode and the partitioning layer quantity N that are of the current block.

In a third optional implementation of the third aspect, the determining module is further configured to: before determining, in the target transform set, the corresponding transform pair of each region of the at least two regions that constitute the to-be-decoded current block, determine the target transform set in a plurality of preset transform sets based on a prediction mode, the partitioning mode, and the partitioning layer quantity N that are of the current block.

In a fourth optional implementation of the third aspect, the determining module is further configured to determine whether the current block meets a partitioning condition, where the partitioning condition is that a width of the current block is greater than a preset width threshold, or that a height of the current block is greater than a preset height threshold; and the partitioning module is specifically configured to: when it is determined that the current block meets the partitioning condition, perform N-layer partitioning on the current block based on the preset partitioning mode to obtain the at least two regions.

In a fifth optional implementation of the third aspect, the video decoding device provided in this embodiment of the present disclosure further includes a parsing module. The parsing module is configured to parse a bitstream corresponding to a bitstream layer at which the current block is located, to obtain first transform indication information, where the first transform indication information is used to indicate whether the current block needs to be inverse transformed by region; and the partitioning module is specifically configured to: when the first transform indication information indicates that the current block needs to be inverse transformed by region, perform N-layer partitioning on the current block based on the preset partitioning mode to obtain the at least two regions.

In a sixth optional implementation of the third aspect, the parsing module is specifically configured to: parse a bitstream corresponding to a sequence layer, a picture layer, or a slice layer at which the current block is located, to obtain second transform indication information, where the second transform indication information is used to indicate whether the sequence layer, the picture layer, or the slice layer includes a to-be-decoded block that needs to be inverse transformed by region; and when the second transform indication information indicates that the sequence layer, the picture layer, or the slice layer includes the to-be-decoded block that needs to be inverse transformed by region, parse the bitstream corresponding to the bitstream layer at which the current block is located, to obtain the first transform indication information.

In the first aspect and the third aspect, the partitioning mode of the current block is the quadtree partitioning mode, the partitioning layer quantity N of the current block is 1, and the at least two regions are specifically an upper-left corner region, an upper-right corner region, a lower-left corner region, and a lower-right corner region. Correspondingly, a transform pair that corresponds to the upper-left corner region and that is included in the target transform set includes: a horizontal transform core DCT-VIII and a vertical transform core DCT-VIII; a transform pair that corresponds to the upper-right corner region and that is included in the target transform set includes: a horizontal transform core DST-VII and a vertical transform core DCT-VIII; a transform pair that corresponds to the lower-left corner region and that is included in the target transform set includes: a horizontal transform core DCT-VIII and a vertical transform core DST-VII; and a transform pair that corresponds to the lower-right corner region and that is included in the target transform set includes: a horizontal transform core DST-VII and a vertical transform core DST-VII.

According to a fourth aspect, a video encoding device is provided. The video encoding device includes a determining module and a transform module. The determining module is configured to determine, in a target transform set, a corresponding transform pair of each region of at least two regions that constitute a to-be-encoded current block, where the at least two regions do not overlap each other, the target transform set includes a correspondence between a transform pair and a position of a region in the current block, and the transform pair includes a horizontal transform core and a vertical transform core. The transform module is configured to: transform each region based on the corresponding transform pair of each region to obtain a transform result of each region, and obtain a transform result of the current block based on the transform result of each region and a position of each region in the current block.

In a first optional implementation of the fourth aspect, the video encoding device provided in this embodiment of the present disclosure further includes a partitioning module. The partitioning module is configured to perform N-layer partitioning on the current block based on a preset partitioning mode to obtain the at least two regions, where $1 \leq N \leq N1$, N1 is a maximum partitioning layer quantity, and the preset partitioning mode includes at least one of the following partitioning modes: a quadtree partitioning mode, a binary tree partitioning mode, or a ternary tree partitioning mode.

In a second optional implementation of the fourth aspect, the determining module is further configured to: before determining, in the target transform set, the corresponding transform pair of each region of the at least two regions that constitute the to-be-encoded current block, determine the target transform set in a plurality of preset transform sets based on the partitioning mode and the partitioning layer quantity N that are of the current block.

In a third optional implementation of the fourth aspect, the determining module is further configured to: before determining, in the target transform set, the corresponding transform pair of each region of the at least two regions that constitute the to-be-encoded current block, determine the target transform set in a plurality of preset transform sets based on a prediction mode, the partitioning mode, and the partitioning layer quantity N that are of the current block.

In a fourth optional implementation of the fourth aspect, the determining module is further configured to determine whether the current block meets a partitioning condition, where the partitioning condition is that a width of the current block is greater than a preset width threshold, or that a height of the current block is greater than a preset height threshold; and the partitioning module is specifically configured to: when it is determined that the current block meets the partitioning condition, perform N-layer partitioning on the current block based on the preset partitioning mode to obtain the at least two regions.

In a fifth optional implementation of the fourth aspect, the determining module is further configured to: determine a first rate-distortion cost and a second rate-distortion cost, where the first rate-distortion cost is a rate-distortion cost of the current block when the current block is transformed by region to obtain the transform result of the current block, and the second rate-distortion cost is a rate-distortion cost of the current block when the current block is directly transformed to obtain the transform result of the current block; and determine transform indication information when the first rate-distortion cost is less than or equal to the second rate-distortion cost, where the transform indication information is used to indicate, to a video decoding device, that the current block needs to be inverse transformed by region.

In the second aspect and the fourth aspect, the partitioning mode of the current block is the quadtree partitioning mode, the partitioning layer quantity N of the current block is 1, and the at least two regions are specifically an upper-left corner region, an upper-right corner region, a lower-left corner region, and a lower-right corner region. Correspondingly, a transform pair that corresponds to the upper-left corner region and that is included in the target transform set includes: a horizontal transform core DCT-VIII and a vertical transform core DCT-VIII; a transform pair that corresponds to the upper-right corner region and that is included in the target transform set includes: a horizontal transform core DST-VII and a vertical transform core DCT-VIII; a transform pair that corresponds to the lower-left corner region and that is included in the target transform set includes: a horizontal transform core DCT-VIII and a vertical transform core DST-VII; and a transform pair that corresponds to the lower-right corner region and that is included in the target transform set includes: a horizontal transform core DST-VII and a vertical transform core DST-VII.

In the second aspect and the fourth aspect, when the first rate-distortion cost is greater than the second rate-distortion cost, the transform indication information is used to indicate, to the video decoding device, that the current block does not need to be inverse transformed by region.

According to a fifth aspect, this disclosure provides a video decoding device. The video decoding device may include a processor and a memory coupled to the processor. The memory is configured to store a computer instruction. When the video decoding device runs, the processor executes the computer instruction stored in the memory, to enable the video decoding device to perform the inverse transform method in picture block decoding in any one of the first aspect or the optional implementations of the first aspect.

According to a sixth aspect, this disclosure provides a computer-readable storage medium. The computer-readable storage medium includes a computer instruction. When the computer instruction is run on a computer, the computer is enabled to perform the inverse transform method in picture block decoding in any one of the first aspect or the optional implementations of the first aspect.

According to a seventh aspect, this disclosure provides a computer program product including an instruction. When the computer program product runs on a computer, the computer is enabled to perform the inverse transform method in picture block decoding in any one of the first aspect or the optional implementations of the first aspect.

For descriptions of related content and technical effects of the fifth aspect to the seventh aspect, refer to the related descriptions of the related content and technical effects of the first aspect and the optional implementations of the first aspect. Details are not described herein again.

According to an eighth aspect, this disclosure provides a video encoding device. The video encoding device may include a processor and a memory coupled to the processor. The memory is configured to store a computer instruction. When the video encoding device runs, the processor executes the computer instruction stored in the memory, to enable the video encoding device to perform the transform method in picture block encoding in any one of the second aspect or the optional implementations of the second aspect.

According to a ninth aspect, this disclosure provides a computer-readable storage medium. The computer-readable storage medium includes a computer instruction. When the computer instruction is run on a computer, the computer is enabled to perform the transform method in picture block encoding in any one of the second aspect or the optional implementations of the second aspect.

According to a tenth aspect, this disclosure provides a computer program product including an instruction. When the computer program product runs on a computer, the computer is enabled to perform the transform method in picture block encoding in any one of the second aspect or the optional implementations of the second aspect.

For descriptions of related content and technical effects of the eighth aspect to the tenth aspect, refer to the related descriptions of the related content and technical effects of the second aspect and the optional implementations of the second aspect. Details are not described herein again.

BRIEF DESCRIPTION OF DRAWINGS

FIG. 8 is a schematic diagram of partitioning a current block according to an embodiment of the present disclosure;

DESCRIPTION OF EMBODIMENTS

Figure 1:
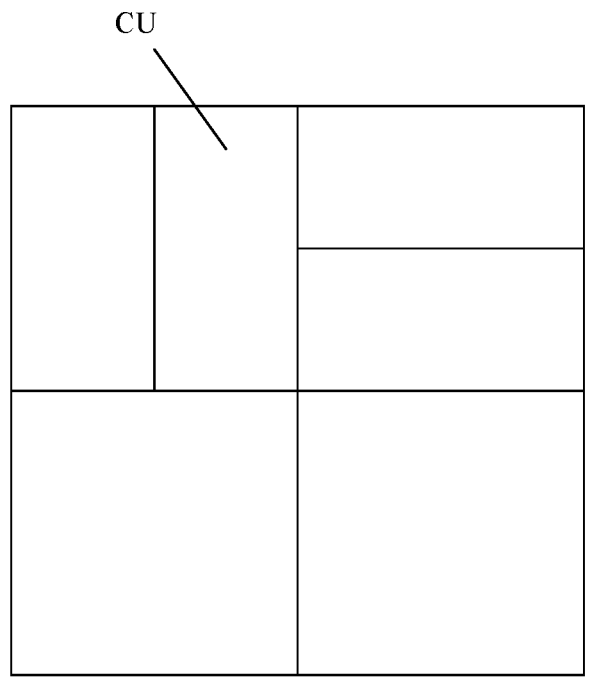
FIG. 1 is a first schematic diagram of a CTU splitting result according to an embodiment of the present disclosure.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of the present disclosure, the terms "first", "second", and so on are intended to distinguish between different objects but do not indicate a particular order of the objects. For example, first transform indication information, second transform indication information, and the like are used to distinguish between different indication information, but are not used to describe a specific order of the indication information.

In the embodiments of the present disclosure, the word "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the word "example" or "for example" or the like is intended to present a relative concept in a specific manner.

In the description of the embodiments of the present disclosure, unless otherwise stated, "a plurality of" means two or more than two. For example, a plurality of transform sets mean two or more transform sets. A plurality of processing units mean two or more processing units.

Some concepts in a transform method in picture block encoding, an inverse transform method in picture block decoding, and an apparatus that are provided in the embodiments of the present disclosure are first described and explained.

A video frame (which may also be referred to as a picture) of video data is used as an example. Generally, in a video encoding process, a video encoding device encodes (performs encoding processing such as prediction, transform, quantization, and entropy coding), according to a specific encoding rule by coding unit CU (corresponding to a coding block), all CUs included in one coding tree unit CTU, and further encodes a plurality of CTUs included in one picture, to obtain encoded information corresponding to the picture. In a video data decoding process, a decoding device reconstructs (performs decoding processing such as prediction, inverse quantization, and inverse transform), according to a decoding rule corresponding to the encoding rule in the encoding process, a plurality of CUs included in one CTU, and further reconstructs a plurality of CTUs in one picture, to obtain a reconstructed picture.

Both the CTU and the CU are nodes of a coding tree. The CTU is a root node, and the CTU is split into a specific quantity of nodes. Further, some or all of nodes obtained by splitting the CTU at a time may be further split into nodes of a smaller size, and so on, until all nodes do not need to be further split. A final node that does not need to be further split is referred to as a leaf node, in other words, the leaf node is an end node that is of the coding tree and that does not need to be further split. In H.266, one leaf node corresponds to one CU.

It should be noted that, in the embodiments of the present disclosure, in the foregoing CU encoding or decoding process, whether to perform the following operations needs to be further considered: partitioning the CU to obtain a plurality of regions, and transforming or inverse transforming each region, to obtain a transform result or an inverse transform result of the CU based on transform results or inverse transform results of the plurality of regions.

Figure 2:
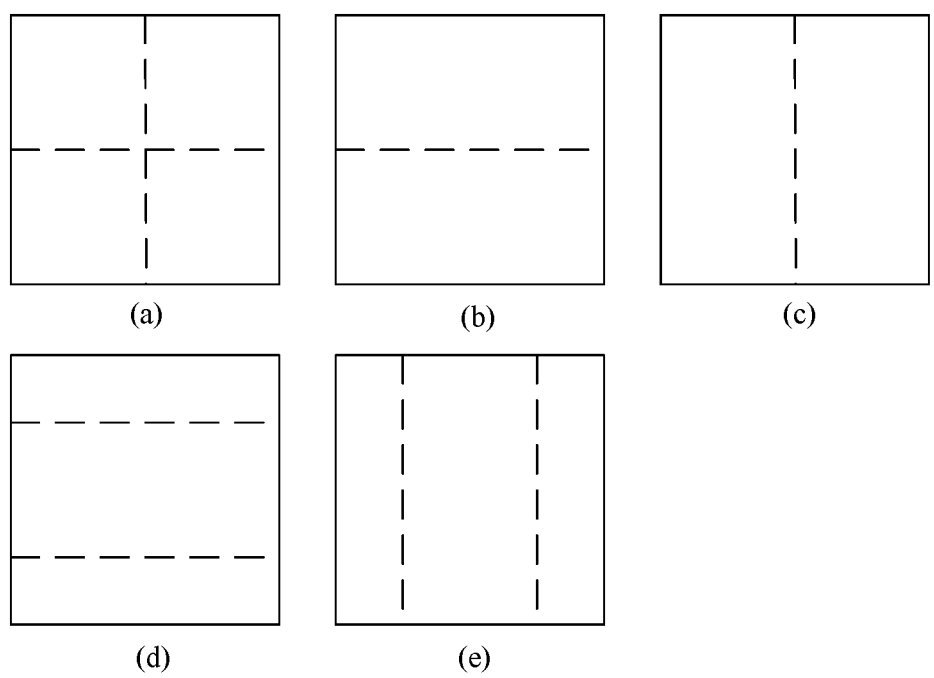
FIG. 2 is a schematic diagram of a CU partitioning result according to an embodiment of the present disclosure.

In the video data encoding and decoding field, a method for partitioning the CU to obtain the plurality of regions includes quadtree partitioning, binary tree partitioning, ternary tree partitioning, or the like. For example, one CU is partitioned into a plurality of regions. In quadtree partitioning, the CU is partitioned into four regions of a same size. As shown in FIG. 2, (a) is a schematic diagram of quadtree partitioning. In binary tree partitioning, the CU is partitioned into two regions of a same size. Specifically, horizontal binary tree partitioning or vertical binary tree partitioning may be used. For FIG. 2 (b) is a schematic diagram of horizontal binary tree partitioning, and (c) is a schematic diagram of vertical binary tree partitioning. In ternary tree partitioning, the CU is partitioned into three regions. Specifically, horizontal ternary tree partitioning or vertical ternary tree partitioning may be used. For horizontal ternary tree partitioning, proportions of heights of upper, middle, and lower regions to a current CU height may be ¼, ½, and ¼ respectively. Correspondingly, for vertical ternary tree partitioning, proportions of widths of the left, middle, and right regions to a current CU width may be ¼, ½, and ¼ respectively. As shown in FIG. 2, (d) is a schematic diagram of horizontal ternary tree partitioning, and (e) is a schematic diagram of vertical ternary tree partitioning.

Optionally, the CU may be partitioned through any one or more of quadtree partitioning, ternary tree partitioning, or binary tree partitioning. For example, in an implementation, a quadtree plus binary tree partitioning method may be used. To be specific, quadtree partitioning is first performed on a CU to obtain four regions, and if one or more of the four regions may be further partitioned, binary tree partitioning is performed to partition, into smaller regions, a region that needs to be further partitioned.

To resolve the problem in the background part, the embodiments of the present disclosure provide the transform method in picture block encoding, the inverse transform method in picture block decoding, and the apparatus. In the video data encoding process, the video encoding device may partition a to-be-encoded current block (the to-be-encoded current block is a CU) to obtain at least two regions, determine, in a target transform set, a corresponding transform pair of each region of the at least two regions that constitute the to-be-encoded current block, transform each region based on the corresponding transform pair of each region, and finally obtain a transform result of the to-be-encoded current block based on a transform result of each region and a position of each region in the to-be-encoded current block, to complete encoding of the to-be-encoded current block. In the video data decoding process, the video decoding device may partition a to-be-decoded current block to obtain at least two regions, determine, in a target transform set, a corresponding transform pair of each region of the at least two regions that constitute the to-be-decoded current block, inverse transform each region based on the corresponding transform pair of each region, and finally obtain an inverse transform result of the to-be-decoded current block based on an inverse transform result of each region and a position of each region in the to-be-decoded current block, to complete decoding of the to-be-decoded current block. This can reduce complexity of encoding and decoding the video data, and improve efficiency of encoding and decoding the video data.

The transform method in picture block encoding and the inverse transform method in picture block decoding that are provided in the embodiments of the present disclosure may be applied to a device that has encoding and/or decoding functions. In the embodiments of the present disclosure, a device for encoding the video data is referred to as the video encoding device, and a device for decoding the video data is referred to as the video decoding device. After the video encoding device obtains the video data, the video encoding device encodes the video data. The video encoding device may compress the video data into a bitstream (namely, encoded video data), and then send the encoded video data to another device (for example, the video decoding device). The video decoding device obtains the encoded video data, and the video decoding device may decode the video data to restore complete information of the video data.

Figure 3:
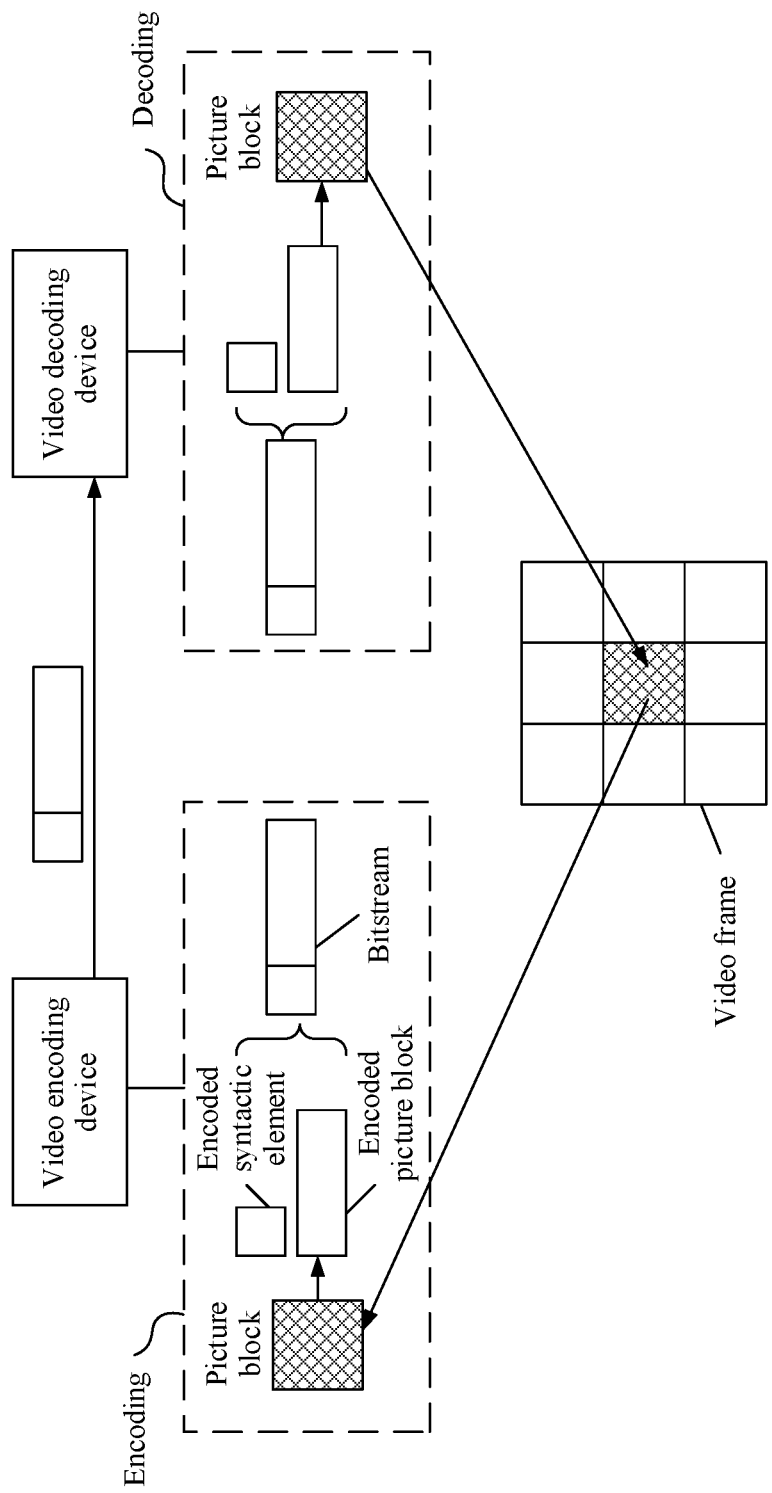
FIG. 3 is a schematic diagram of a video data encoding and decoding process according to an embodiment of the present disclosure.

In the following, as shown in FIG. 3, the video data encoding process and the video data decoding process are briefly described by using a picture block (which may be a CU) in a video frame of the video data as an example. In the encoding process, the picture block is referred to as a to-be-encoded block. In the decoding process, the picture block is referred to as a to-be-decoded block. Encoding performed by the video encoding device on the to-be-encoded block includes processing procedures such as prediction, transform, quantization, and entropy coding. After obtaining a prediction block of the to-be-encoded block through prediction, the video encoding device obtains a residual block (the residual block is a difference between the original block and the prediction block). Then, the encoding device may transform the residual block based on a transform pair (the transform pair includes a horizontal transform core and a vertical transform core), quantize a transformed residual block, and perform entropy coding (in other words, encode parameters such as a syntactic element), to complete encoding of the to-be-encoded block. In the foregoing encoding process, the transform core may be any type of transform core based on discrete cosine transform (DCT) (for example, DCT-II or DCT-VIII), or may be any type of transform core based on discrete sine transform (DST) (for example, DST-VII). In addition, the video encoding process further includes corresponding encoding performed on the syntactic element (for example, a splitting flag or a splitting mode). An encoded syntactic element and an encoded picture block constitute encoded information (namely, a bitstream). In other words, encoded information of the video data includes encoded picture data and encoded syntactic elements. Decoding performed by the video decoding device on the to-be-decoded block includes processing procedures such as entropy decoding, prediction, inverse transform, and inverse quantization. The video decoding process is an inverse process of the video encoding process. The video decoding device reconstructs the picture block (namely, the to-be-decoded block) based on a syntactic element extracted from encoded information. To be specific, the video decoding device obtains a reconstructed pixel block of the picture block based on the syntactic element associated with the picture block and an encoded picture block, and completes decoding of the to-be-decoded block.

The transform method in picture block encoding and the inverse transform method in picture block decoding that are provided in the embodiments of the present disclosure may be applied to the video encoding device or the video decoding device. Both the video encoding device and the video decoding device may be desktop computers, mobile computing apparatuses, notebook (for example, laptop) computers, tablet computers, set-top boxes, handheld devices such as intelligent telephones, televisions, cameras, display apparatuses, digital media players, video game consoles, vehicle-mounted computers, virtual reality devices, augmented reality devices, or other similar devices.

Figure 4:
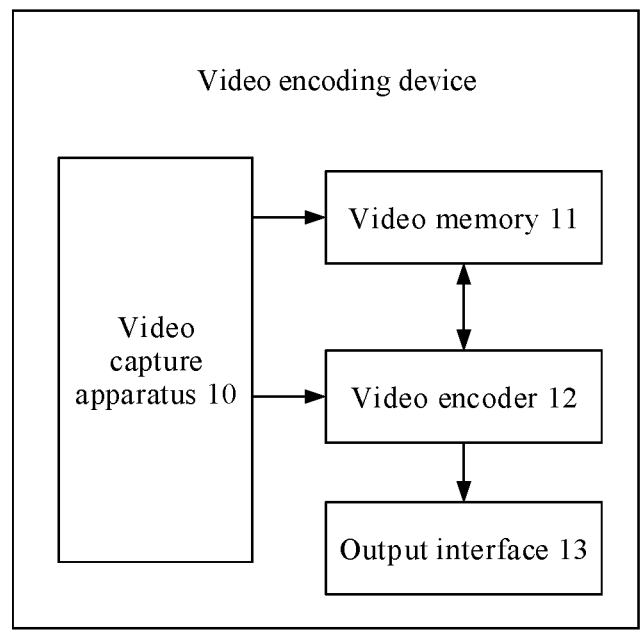
FIG. 4 is a schematic diagram of hardware of a video encoding device according to an embodiment of the present disclosure.

With reference to FIG. 4, the following specifically describes various components of a video encoding device provided in an embodiment of the present disclosure. As shown in FIG. 4, the video encoding device provided in this embodiment of the present disclosure includes components such as a video capture apparatus 10, a video memory 11, a video encoder 12, and an output interface 13. A person skilled in the art may understand that a structure of the video encoding device shown in FIG. 4 does not constitute any limitation on the video encoding device, and the video encoding device may include more or fewer components than those shown in FIG. 4, or may include a combination of some of the components shown in FIG. 4, or may include components arranged differently from those shown in FIG. 4.

The video capture apparatus 10 is an apparatus for obtaining video data. The video capture apparatus may be a video camera.

The video memory 11 may store the video data captured by the video capture apparatus, or may store a bitstream obtained after the video encoder 12 encodes the video data.

The video encoder 12 may encode, according to a coding standard (for example, H.264), the video data obtained by the video capture apparatus, and convert encoded video data into code that can be identified by a machine, to compress the video data, thereby facilitating transmission and storage of the video data. The video encoder 12 may be a central processing unit (CPU), a general-purpose processor, a digital signal processor (DSP), an application-specific integrated circuit (, ASIC), a field programmable gate array (FPGA) or another programmable logic device, a transistor logic device, a hardware component, or any combination thereof. The video encoder 12 may implement or execute various example logical blocks, modules, and circuits described in content disclosed in the embodiments of the present disclosure. Alternatively, the video encoder 12 may be a combination for implementing a computing function, for example, a combination including one or more microprocessors, or a combination of a DSP and a microprocessor.

The output interface 13 is an interface circuit configured to send data to another device. The output interface 13 may be a structure having a transceiving function, such as a transceiver or a transceiver circuit, and includes a modulator/demodulator (modem) and/or a transmitter. In a video coding system, the output interface 13 may send the encoded video data to a video decoding device.

Optionally, the video encoding device shown in FIG. 4 may further include a wireless fidelity (WiFi) module, a Bluetooth module, and the like. Details are not described herein.

Figure 5:
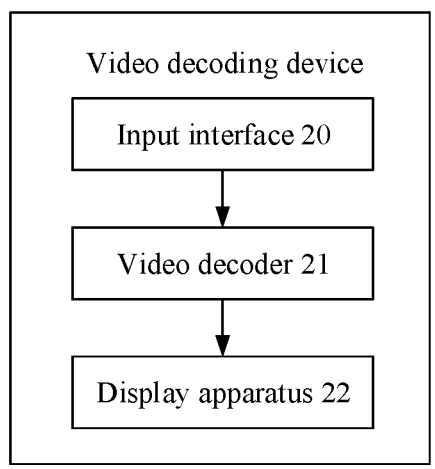
FIG. 5 is a schematic diagram of hardware of a video decoding device according to an embodiment of the present disclosure.

With reference to FIG. 5, the following specifically describes various components of a video decoding device provided in an embodiment of the present disclosure. As shown in FIG. 5, the video decoding device provided in this embodiment of the present disclosure includes components such as an input interface 20, a video decoder 21, and a display apparatus 22. A person skilled in the art may understand that a structure of the video decoding device shown in FIG. 5 does not constitute any limitation on the video decoding device, and the video decoding device may include more or fewer components than those shown in FIG. 5, or may include a combination of some of the components shown in FIG. 5, or may include components arranged differently from those shown in FIG. 5.

The input interface 20 is configured to receive data sent by another device (for example, a video encoding device). The input interface 20 may be a receiver and/or a modem. In a video coding system, the input interface 20 may receive encoded video data sent by an encoding device.

The video decoder 21 may restore and decode, namely, decompress, the encoded video data received by the video decoder 21, so that decoded video data can be played in the display apparatus. The video decoder 21 may be a CPU, a general-purpose processor, a DSP, an ASIC, an FPGA or another programmable logic device, a transistor logic device, a hardware component, or any combination thereof. The video decoder 21 may implement or execute various example logical blocks, modules, and circuits described in content disclosed in the embodiments of the present disclosure. Alternatively, the video decoder 21 may be a combination for implementing a computing function, for example, a combination including one or more microprocessors, or a combination of a DSP and a microprocessor.

The display apparatus 22 is configured to display the decoded video data. The display apparatus may include a plurality of types of display apparatuses, for example, a liquid crystal display (LCD), a plasma display, an organic light-emitting diode (OLED) display, or another type of display apparatus. Optionally, the display apparatus 22 may be integrated into the video decoding device, or the display apparatus 22 may be independent of the video decoding device and disposed outside the video decoding device.

The transform method in picture block encoding provided in the embodiments of the present disclosure may be applied to a video data encoding scenario, to transform a to-be-encoded block. The inverse transform method in picture block decoding provided in the embodiments of the present disclosure may also be applied to a video data decoding scenario, to inverse transform a to-be-decoded block. The following separately describes, from a perspective of the two different disclosure scenarios, the transform method in picture block encoding and the inverse transform method in picture block decoding that are provided in the embodiments of the present disclosure.

It should be noted that, when an encoding prediction mode of video data is a skip (skip) mode (that is, an error between prediction information and original information of the to-be-encoded block is very small), a residual of the to-be-encoded block does not need to be transformed. In this way, in a decoding process, a bitstream corresponding to the to-be-decoded block does not need to be inverse transformed, either. It may be understood that the transform method in picture block encoding and the inverse transform method in picture block decoding that are provided in the embodiments of the present disclosure are applied to an encoding process or a decoding process in which a prediction mode of the video data is not the skip mode.

Figure 6:
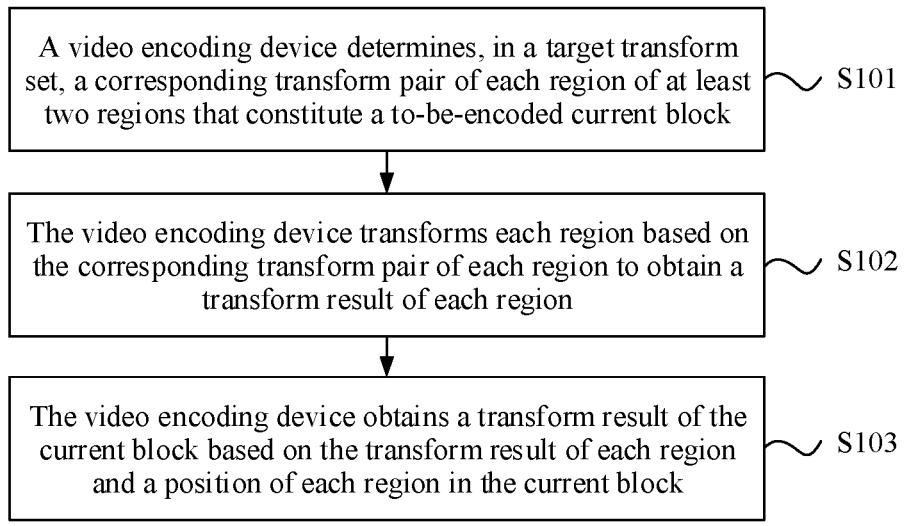
FIG. 6 is a first schematic diagram of a transform method in picture block encoding according to an embodiment of the present disclosure.

For the video data encoding scenario, a transform method in picture block encoding provided in an embodiment of the present disclosure is described by using a to-be-encoded current block as an example. As shown in FIG. 6, the method may include S101 to S103.

S101: A video encoding device determines, in a target transform set, a corresponding transform pair of each region of at least two regions that constitute a to-be-encoded current block.

The at least two regions do not overlap each other, the target transform set includes a correspondence between a transform pair and a position of a region in the current block (in a video data encoding process below, the current block is the to-be-encoded current block), and the transform pair includes a horizontal transform core and a vertical transform core.

In this embodiment of the present disclosure, the to-be-encoded current block is a CU. The at least two regions that constitute the to-be-encoded current block may be obtained in the following manner: performing, by the video encoding device, N-layer partitioning on the current block based on a preset partitioning mode to obtain the at least two regions.

$1 \leq N \leq N1$ and N1 is a maximum partitioning layer quantity. The preset partitioning mode includes at least one of the following partitioning modes: a quadtree partitioning mode, a binary tree partitioning mode, or a ternary tree partitioning mode.

It should be noted that partitioning performed on the current block in the following embodiments is to partition a prediction residual block of a picture corresponding to the current block.

Figure 7:
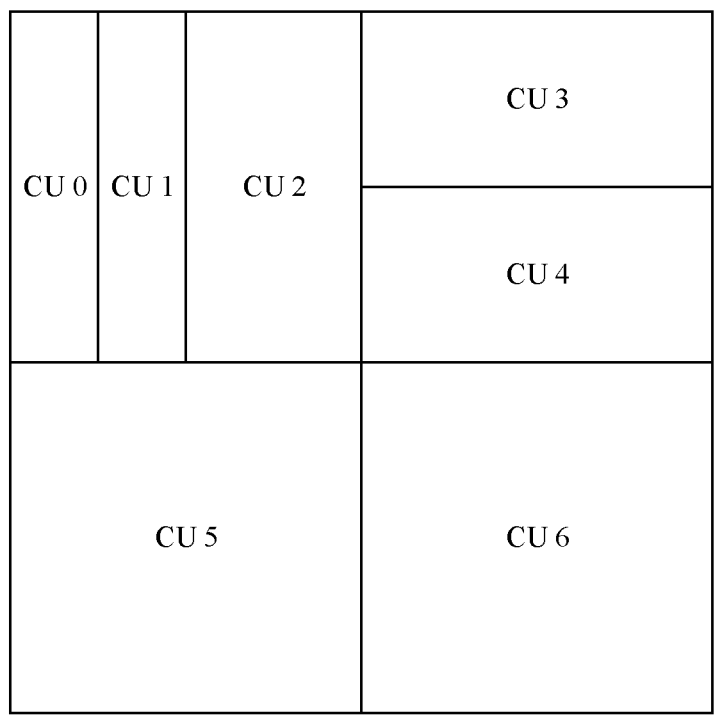
FIG. 7 is a second schematic diagram of a CTU splitting result according to an embodiment of the present disclosure.

In this embodiment of the present disclosure, in a process of encoding one video frame, the video frame may be split into a plurality of CTUs, and each CTU may be split into a plurality of CUs. The current block in S101 may be one of the plurality of CUs. For example, one CTU is split into a plurality of CUs. If a size of the CTU is 64*64 (the CTU is a rectangular pixel matrix including 64 columns and 64 rows of pixels), the CTU is split into the plurality of CUs by using a quadtree plus binary tree splitting method. First, the CTU is split into four 32*32 child nodes by using a quadtree splitting method. Then, the 32*32 child node in an upper-left corner is split into two 16*32 child nodes (where a width is 16 and a height is 32) through vertical binary tree splitting, where the 16*32 child node located on the left is further split into two 8*32 CUs through vertical binary tree splitting, and the 16*32 child node located on the right is no longer split. The 32*32 child node in an upper-right corner is split into two 32*16 child nodes through horizontal binary tree splitting, and the two 32*16 child nodes are no longer split. The 32*32 child node in a lower-left corner and the 32*32 child node in a lower-right corner are no longer split. In conclusion, as shown in FIG. 7, the CTU is split into seven CUs. Some CUs are square, and the other CUs are rectangular. The seven CUs are sequentially numbered a CU 0 to a CU 6.

Optionally, in this embodiment of the present disclosure, specifically, a method used by the video encoding device to perform N-layer partitioning on the current block based on the preset partitioning mode to obtain the at least two regions may be: determining, by the video encoding device, whether the current block meets a partitioning condition, where the partitioning condition is that a width of the current block is greater than a preset width threshold, or that a height of the current block is greater than a preset height threshold.

In this embodiment of the present disclosure, whether the current block needs to be transformed by region may be determined based on the preset width threshold and the preset height threshold. When the width of the current block is greater than the preset width threshold, the current block may be vertically partitioned. When the height of the current block is greater than the preset height threshold, the current block may be horizontally partitioned.

The preset width threshold and the preset height threshold may be the same or may be different. The preset width threshold may be 16, 32, 64, 128, 256, or the like. The preset height threshold may also be 16, 32, 64, 128, 256, or the like.

It should be noted that, in this embodiment of the present disclosure, in S101, the maximum partitioning layer quantity N1 of the current block is related to a size of the current block, the preset width threshold, and the preset height threshold. For example, if the size of the current block is 64*64, both the preset width threshold and the preset height threshold are 16, and the partitioning mode of the current block is the quadtree partitioning mode, the maximum partitioning layer quantity of the current block is 2. Specifically, the width of the current block is greater than the preset width threshold, and the height of the current block is greater than the preset height threshold. Therefore, quadtree partitioning may be first performed on the current block to obtain four 32*32 regions. For each 32*32 region, because a width of the 32*32 region is still greater than the preset width threshold, and a height of the region is still greater than the preset height threshold, quadtree partitioning may be further performed on each 32*32 region. In this way, 16 16*16 regions are obtained. For each 16*16 region, because the 16*16 region does not meet the partitioning condition, the 16*16 region is no longer partitioned. It can be learned that the maximum partitioning layer quantity of the current block is 2.

In this embodiment of the present disclosure, for a CU of a different size, the video encoding device may further partition the CU to obtain at least two regions. For example, if the current block is a CU 5 in FIG. 7, it can be learned that the size of the current block is 32*32. If the partitioning mode is the quadtree partitioning mode, and the partitioning layer quantity N is 1, one-layer partitioning is performed on the current block to obtain four 16*16 regions, and as shown in (a) in FIG. 8, position indexes of the four regions are 0, 1, 2, and 3 in sequence. If the partitioning mode is the quadtree partitioning mode, and the partitioning layer quantity N is 2, two-layer partitioning is performed on the current block, that is, the quadtree partitioning mode is used to further perform one-layer partitioning on each of four 16*16 regions that are obtained through one-layer partitioning. In this way, 16 regions may be obtained by performing two-layer partitioning on the current block, and as shown in (b) in FIG. 8, position indexes of the 16 regions are 0 to 15 in sequence.

If the current block is the CU 5 in FIG. 7, and if the partitioning mode is the binary tree partitioning mode (including a horizontal binary tree partitioning mode or a vertical binary tree partitioning mode) and the partitioning layer quantity N is 1, one-layer partitioning is performed on the current block to obtain two regions. Specifically, two 32*16 regions may be obtained by using the horizontal binary tree partitioning mode, and as shown in (c) in FIG. 8, position indexes of the two regions from top to bottom are 0 and 1 in sequence. Two 16*32 regions may be obtained by using the vertical binary tree partitioning mode, and as shown in (d) in FIG. 8, position indexes of the two regions from left to right are 0 and 1 in sequence. If the partitioning mode is the binary tree partitioning mode, and the partitioning layer quantity N is 2, two-layer partitioning is performed on the current block (that is, the binary tree partitioning mode is used to further perform one-layer partitioning on each of two regions that are obtained through one-layer binary tree partitioning), to obtain four regions. Specifically, four 32*8 regions may be obtained by using the horizontal binary tree partitioning mode, and as shown in (e) in FIG. 8, position indexes of the four regions from top to bottom are 0, 1, 2, and 3 in sequence. Four 8*32 regions may be obtained by using the vertical binary tree partitioning mode, and as shown in (0 in FIG. 8, position indexes of the four regions from left to right are 0, 1, 2, and 3 in sequence.

Optionally, when the current block is partitioned based on the ternary tree partitioning mode, if the size of the current block is 64*64, the partitioning mode is the ternary tree partitioning mode (including a horizontal ternary tree partitioning mode or a vertical ternary tree partitioning mode), and the partitioning layer quantity N is 1, one-layer partitioning is performed on the current block to obtain three regions. Specifically, two 64*16 regions and one 64*32 region may be obtained by using the horizontal ternary tree partitioning mode, and as shown in (g) in FIG. 8, position indexes of the three regions from top to bottom are 0, 1, and 2 in sequence. Two 16*64 regions and one 32*64 region may be obtained by using the vertical ternary tree partitioning mode, and as shown in (h) in FIG. 8, position indexes of the three regions from left to right are 0, 1, and 2 in sequence. If the partitioning mode is the ternary tree partitioning mode, and the partitioning layer quantity N is 2, two-layer partitioning is performed on the current block to obtain nine regions. Specifically, with reference to (g) in FIG. 8, horizontal ternary tree partitioning is further performed on each of three regions obtained after horizontal ternary tree partitioning is performed on the current block, and as shown in (i) in FIG. 8, position indexes of the nine regions from top to bottom are 0 to 8 in sequence. With reference to (h) in FIG. 8, vertical ternary tree partitioning is further performed on each of three regions obtained after vertical ternary tree partitioning is performed on the current block, and as shown in (j) in FIG. 8, position indexes of the nine regions from left to right are 0 to 8 in sequence.

In this embodiment of the present disclosure, a video encoding device may flexibly partition the current block by using one or more of the foregoing plurality of partitioning modes. In this way, region sizes can be diversified.

It should be noted that, in this embodiment of the present disclosure, one to-be-encoded block may be partitioned into at least two regions by using different partitioning modes and different partitioning layer quantities. In addition, for different partitioning modes and different partitioning layer quantities, the to-be-encoded block may correspond to different transform sets. A transform set includes a correspondence between a transform pair and a position of a region in the to-be-encoded block. The correspondence between the transform pair and the position of the region in the to-be-encoded block is described in detail in the following embodiments.

S102: The video encoding device transforms each region based on the corresponding transform pair of each region to obtain a transform result of each region.

In this embodiment of the present disclosure, after the video encoding device determines the corresponding transform pair of each region of the at least two regions of the current block, based on the transform pair corresponding to a position of each region, the video encoding device horizontally transforms each region by using the horizontal transform core in the transform pair, and vertically transforms each region by using the vertical transform core in the transform pair.

One region of the current block is used as an example. A residual block corresponding to the region is denoted as R. It is assumed that a horizontal transform core in a transform pair corresponding to the region is DST-VII and a vertical transform core in the transform pair corresponding to the region is DCT-VIII, where a transform matrix corresponding to DST-VII is X and a transform matrix corresponding to DCT-VIII is Y. A transform result B of the region R is:

$$B = YRX$$

S103: The video encoding device obtains a transform result of the current block based on the transform result of each region and a position of each region in the current block.

In this embodiment of the present disclosure, after the video encoding device obtains the transform result of each region of the current block, the video encoding device may splice transform results of all regions of the current block based on the position of each region in the current block to obtain the transform result of the current block. Then, the video encoding device may perform quantization and entropy coding on the transform result of the current block to obtain an encoded bitstream of the current block. The encoded bitstream may be stored or may be transmitted to the video decoding device for decoding, so that the picture corresponding to the current block is restored on a decoding side.

Optionally, before S101, the transform method in picture block encoding provided in this embodiment of the present disclosure may further include S104 or S105.

Figure 9:
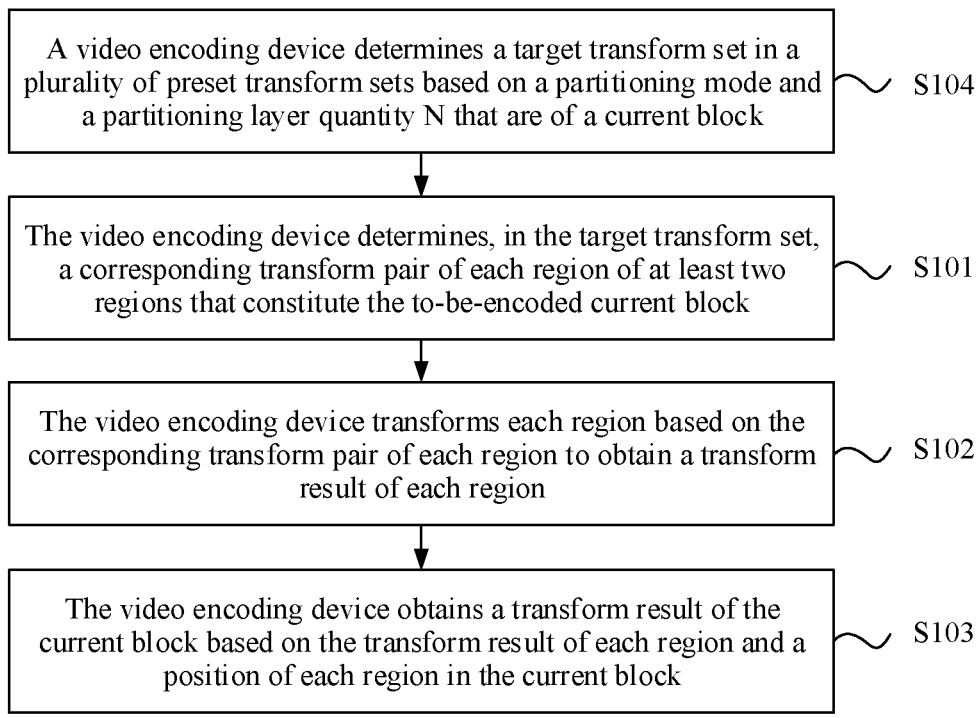
FIG. 9 is a second schematic diagram of a transform method in picture block encoding according to an embodiment of the present disclosure.

Specifically, with reference to FIG. 6, as shown in FIG. 9, before S101, the transform method in picture block encoding provided in this embodiment of the present disclosure may further include the following step:

S104: The video encoding device determines the target transform set in a plurality of preset transform sets based on the partitioning mode and the partitioning layer quantity N that are of the current block.

In this embodiment of the present disclosure, when the current block is partitioned by using different partitioning modes and different partitioning layer quantities, to obtain the at least two regions, the current block may correspond to different transform sets. In other words, there may be the plurality of preset transform sets for the current block. The video encoding device needs to determine the target transform set in the plurality of preset transform sets based on the partitioning mode and the partitioning layer quantity N that are of the current block, and then transform each region based on the corresponding transform pair of each region in the target transform set.

For example, the following describes transform sets corresponding to several different partitioning modes and different partitioning layer quantities.

(1) The partitioning mode is the quadtree partitioning mode, and the partitioning layer quantity N is 1.

Optionally, the partitioning mode of the current block is the quadtree partitioning mode, the partitioning layer quantity N of the current block is 1, and the at least two regions are specifically an upper-left corner region, an upper-right corner region, a lower-left corner region, and a lower-right corner region. Correspondingly, a transform pair that corresponds to the upper-left corner region and that is included in the target transform set includes: a horizontal transform core DCT-VIII and a vertical transform core DCT-VIII; a transform pair that corresponds to the upper-right corner region and that is included in the target transform set includes: a horizontal transform core DST-VII and a vertical transform core DCT-VIII; a transform pair that corresponds to the lower-left corner region and that is included in the target transform set includes: a horizontal transform core DCT-VIII and a vertical transform core DST-VII; and a transform pair that corresponds to the lower-right corner region and that is included in the target transform set includes: a horizontal transform core DST-VII and a vertical transform core DST-VII.

Optionally, the partitioning mode of the current block is the quadtree partitioning mode, and the partitioning layer quantity N of the current block is 1. For the four regions obtained by partitioning the current block, position indexes of the four regions may be set, and each position index corresponds to one transform pair. With reference to (a) in FIG. 8, for example, a position index of the upper-left corner region is set to 0, a position index of the upper-right corner region is set to 1, a position index of the lower-left corner region is set to 2, and a position index of the lower-right corner region is set to 3. In an implementation, the correspondence between the transform pair and the position of the region in the current block (namely, a preset transform set) may be a correspondence shown in the following Table 1.

TABLE 1

| Position index of a region | Horizontal transform core | Vertical transform core |
|---|---|---|
| 0 | DCT-VIII | DCT-VIII |
| 1 | DST-VII | DCT-VIII |
| 2 | DCT-VIII | DST-VII |
| 3 | DST-VII | DST-VII |

(2) The partitioning mode is the quadtree partitioning mode, and the partitioning layer quantity N is 2.

Figure 8:
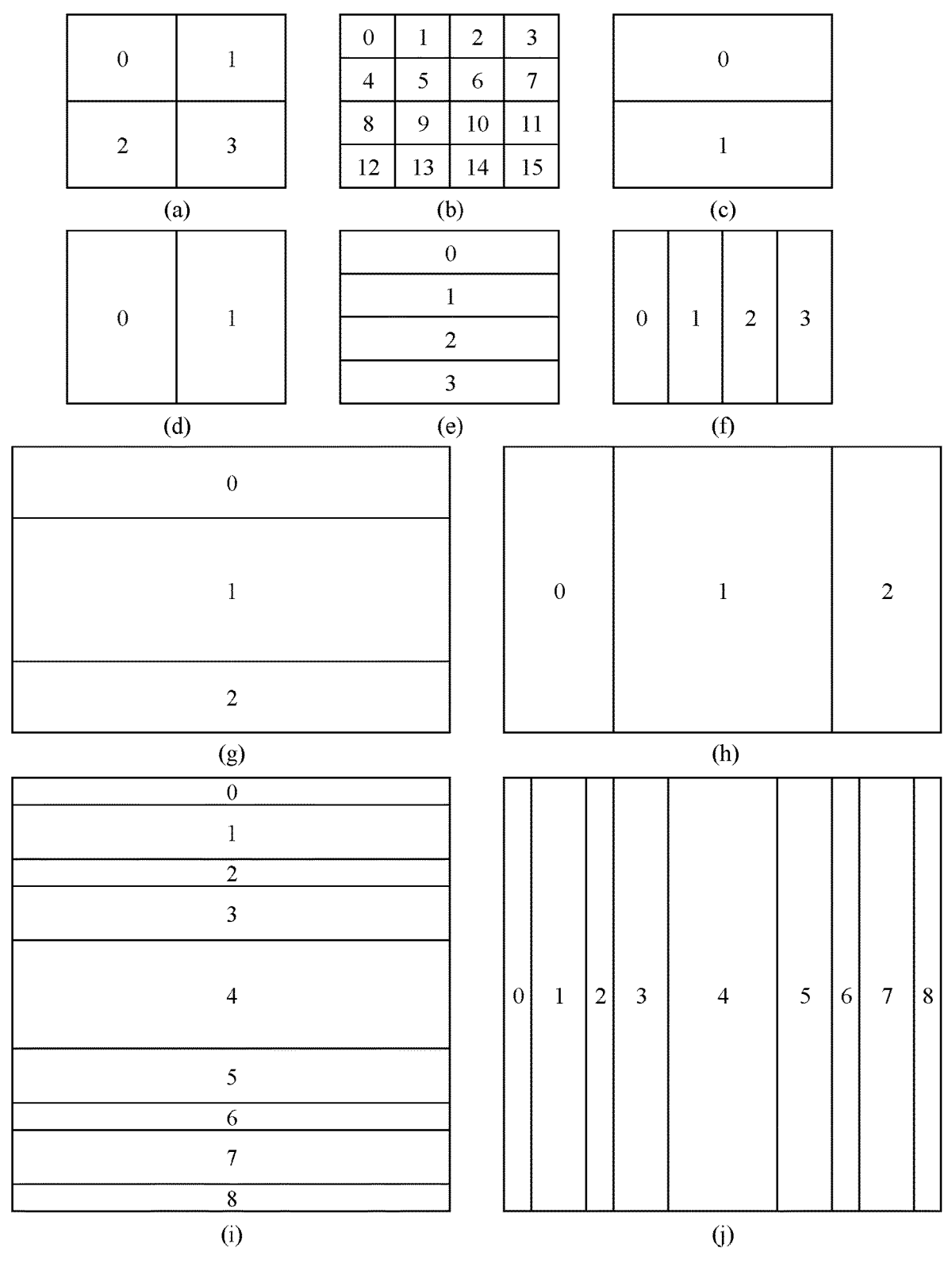

Similarly, with reference to (b) in FIG. 8, the partitioning mode of the current block is the quadtree partitioning mode, the partitioning layer quantity N is 1, and the correspondence between the transform pair and the position of the region in the current block may be a correspondence shown in the following Table 2.

TABLE 2

| Position index of a region | Horizontal transform core | Vertical transform core |
|---|---|---|
| 0 | DCT-VIII | DCT-VIII |
| 1 | DCT-II | DCT-VIII |
| 2 | DCT-II | DCT-VIII |
| 3 | DST-VII | DCT-VIII |
| 4 | DCT-VIII | DCT-II |
| 5 | DCT-II | DCT-II |
| 6 | DCT-II | DCT-II |
| 7 | DST-VII | DCT-II |
| 8 | DCT-VIII | DCT-II |
| 9 | DCT-II | DCT-II |
| 10 | DCT-II | DCT-II |
| 11 | DST-VII | DCT-II |
| 12 | DCT-VIII | DST-VII |
| 13 | DCT-II | DST-VII |
| 14 | DCT-II | DST-VII |
| 15 | DST-VII | DST-VII |

(3) The partitioning mode is the binary tree partitioning mode, and the partitioning layer quantity N is 1.

In this embodiment of the present disclosure, binary tree partitioning includes horizontal binary tree partitioning and vertical binary tree partitioning. With reference to (c) in FIG. 8, when horizontal binary tree partitioning is performed on the current block, the correspondence between the transform pair and the position of the region in the current block may be a correspondence shown in the following Table 3.

TABLE 3

| Position index of a region | Horizontal transform core | Vertical transform core |
|---|---|---|
| 0 | DCT-II | DCT-VIII |
| 1 | DCT-II | DST-VII |

With reference to (d) in FIG. 8, when vertical binary tree partitioning is performed on the current coding block, the correspondence between the transform pair and the position of the region in the current block may be a correspondence shown in the following Table 4.

TABLE 4

| Position index of a region | Horizontal transform core | Vertical transform core |
|---|---|---|
| 0 | DCT-VIII | DCT-II |
| 1 | DST-VII | DCT-II |

(4) The partitioning mode is the binary tree partitioning mode, and the partitioning layer quantity N is 2.

With reference to (e) in FIG. 8, when horizontal binary tree partitioning is performed on the current block, the correspondence between the transform pair and the position of the region in the current block may be a correspondence shown in the following Table 5 or Table 6.

TABLE 5

| Position index of a region | Horizontal transform core | Vertical transform core |
| --- | --- | --- |
| 0 | DCT-II | DCT-VIII |
| 1 | DCT-II | DCT-VIII |
| 2 | DCT-II | DST-VII |
| 3 | DCT-II | DST-VII |

TABLE 6

| Position index of a region | Horizontal transform core | Vertical transform core |
| --- | --- | --- |
| 0 | DCT-II | DCT-VIII |
| 1 | DCT-II | DCT-II |
| 2 | DCT-II | DCT-II |
| 3 | DCT-II | DST-VII |

It should be noted that, in this embodiment of the present disclosure, after two-layer horizontal binary tree partitioning is performed on the current block, each region may be transformed based on the transform pair shown in Table 5, or based on the transform pair shown in Table 6. This may specifically depend on an actual use requirement, and is not limited in this embodiment of the present disclosure.

With reference to (f) in FIG. 8, when vertical binary tree partitioning is performed on the current block, the correspondence between the transform pair and the position of the region in the current block may be a correspondence shown in the following Table 7.

TABLE 7

| Position index of a region | Horizontal transform core | Vertical transform core |
| --- | --- | --- |
| 0 | DCT-VIII | DCT-II |
| 1 | DCT-II | DCT-II |
| 2 | DCT-II | DCT-II |
| 3 | DST-VII | DCT-II |

(5) The partitioning mode is the ternary tree partitioning mode, and the partitioning layer quantity N is 1.

In this embodiment of the present disclosure, ternary tree partitioning includes horizontal ternary tree partitioning and vertical ternary tree partitioning. With reference to (g) in FIG. 8, when horizontal ternary tree partitioning is performed on the current block, the correspondence between the transform pair and the position of the region in the current block may be a correspondence shown in the following Table 8.

TABLE 8

| Position index of a region | Horizontal transform core | Vertical transform core |
| --- | --- | --- |
| 0 | DCT-II | DCT-VIII |
| 1 | DCT-II | DCT-II |
| 2 | DCT-II | DST-VII |

With reference to (h) in FIG. 8, when vertical ternary tree partitioning is performed on the current block, the correspondence between the transform pair and the position of the region in the current block may be a correspondence shown in the following Table 9.

TABLE 9

| Position index of a region | Horizontal transform core | Vertical transform core |
| --- | --- | --- |
| 0 | DCT-VIII | DCT-II |
| 1 | DCT-II | DCT-II |
| 2 | DST-VII | DCT-II |

(6) The partitioning mode is the ternary tree partitioning mode, and the partitioning layer quantity N is 2.

With reference to (i) in FIG. 8, when horizontal ternary tree partitioning is performed on the current block, the correspondence between the transform pair and the position of the region in the current block may be a correspondence shown in the following Table 10.

TABLE 10

| Position index of a region | Horizontal transform core | Vertical transform core |
| --- | --- | --- |
| 0 | DCT-II | DCT-VIII |
| 1 | DCT-II | DCT-VIII |
| 2 | DCT-II | DCT-VIII |
| 3 | DCT-II | DCT-II |
| 4 | DCT-II | DCT-II |
| 5 | DCT-II | DCT-II |
| 6 | DCT-II | DST-VII |
| 7 | DCT-II | DST-VII |
| 8 | DCT-II | DST-VII |

With reference to (j) in FIG. 8, when vertical ternary tree partitioning is performed on the current block, the correspondence between the transform pair and the position of the region in the current block may be a correspondence shown in the following Table 11.

TABLE 11

| Position index of a region | Horizontal transform core | Vertical transform core |
| --- | --- | --- |
| 0 | DCT-VIII | DCT-II |
| 1 | DCT-VIII | DCT-II |
| 2 | DCT-VIII | DCT-II |
| 3 | DCT-II | DCT-II |
| 4 | DCT-II | DCT-II |
| 5 | DCT-II | DCT-II |
| 6 | DST-VII | DCT-II |
| 7 | DST-VII | DCT-II |
| 8 | DST-VII | DCT-II |

Figure 10:
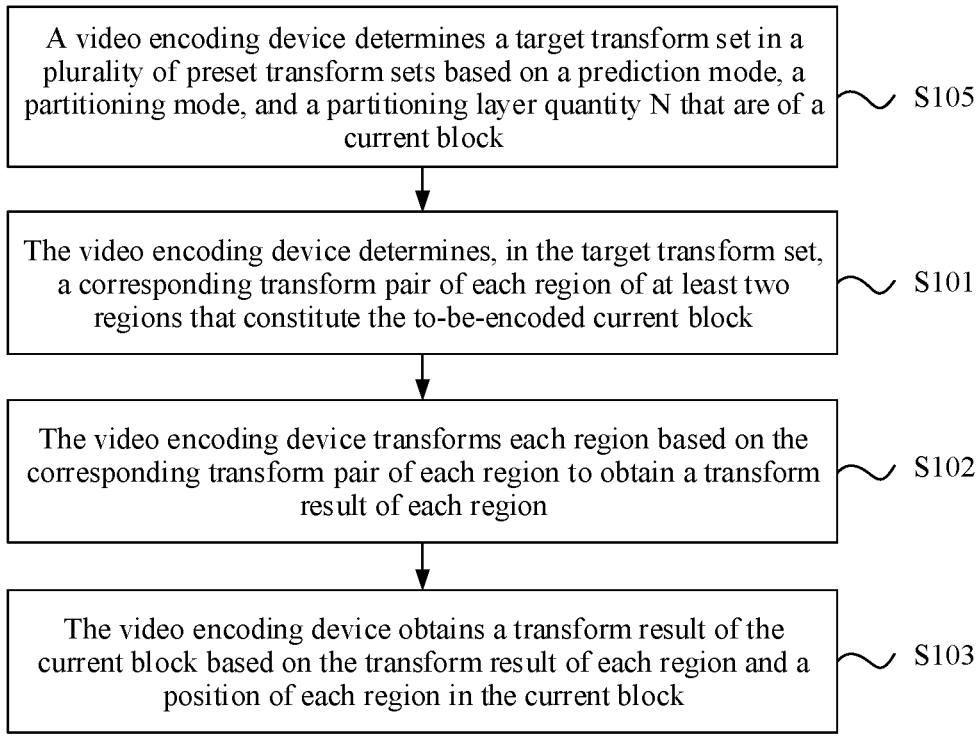
FIG. 10 is a third schematic diagram of a transform method in picture block encoding according to an embodiment of the present disclosure.

With reference to FIG. 6, as shown in FIG. 10, before S101, the transform method in picture block encoding provided in this embodiment of the present disclosure may further include the following step:

S105: The video encoding device determines the target transform set in a plurality of preset transform sets based on a prediction mode, the partitioning mode, and the partitioning layer quantity N that are of the current block.

In this embodiment of the present disclosure, one to-be-encoded block may be encoded by using different prediction modes, and may be partitioned into at least two regions by using different partitioning modes and different partitioning layer quantities. For different prediction modes, different partitioning modes, and different partitioning layer quantities, the to-be-encoded block may correspond to different transform sets. In this way, there may be the plurality of preset transform sets for the current block. The video encoding device needs to determine the target transform set in the plurality of preset transform sets based on the prediction mode, the partitioning mode, and the partitioning layer quantity N that are of the current block, and then transform each region based on the corresponding transform pair of each region in the target transform set.

Optionally, in this embodiment of the present disclosure, the prediction mode of the current block may include a motion vector prediction mode, a merge (merge) mode, and the like. In the merge mode, a reference block at an adjacent position of the current block is selected as a prediction block of the current block, and the adjacent position may include a left side, an upper side, an upper-right side, an upper-left side, and a lower-left side of the current block. In this way, reference blocks at different positions correspond to different merge modes. For example, if a reference block on the left side of the current block is selected, the prediction mode of the current block is a merge left mode. If a reference block on the upper side of the current block is selected as the prediction block of the current block, the prediction mode of the current block is a merge above mode.

For example, when the prediction mode of the current block is the merge left mode, the partitioning mode of the current block is the binary tree partitioning mode, specifically, the horizontal binary tree partitioning mode, and the partitioning layer quantity N of the current mode is 1, the correspondence between the transform pair and the position of the region in the current block may be a correspondence shown in the following Table 12.

TABLE 12

| Position index of a region | Horizontal transform core | Vertical transform core |
|---|---|---|
| 0 | DST-VII | DCT-VIII |
| 1 | DST-VII | DST-VII |

When the prediction mode of the current block is the merge above mode, the partitioning mode of the current block is the binary tree partitioning mode, specifically, the vertical binary tree partitioning mode, and the partitioning layer quantity N of the current mode is 1, the correspondence between the transform pair and the position of the region in the current block may be a correspondence shown in the following Table 13.

TABLE 13

| Position index of a region | Horizontal transform core | Vertical transform core |
|---|---|---|
| 0 | DCT-VIII | DCT-VIII |
| 1 | DCT-VIII | DST-VII |

It may be understood that there are eight types of discrete cosine transforms (namely, DCT), and there are also eight types of discrete sine transforms. For example, if the to-be-transformed vector is $X=[x_0, x_1, \ldots, x_{N-1}]^T$, a result obtained after the to-be-transformed vector is transformed is $Y=[y_0, y_1, \ldots, y_{N-1}]^T$.

The following describes transform formulas of DCT-II, DCT-VIII, and DST-VII in the foregoing embodiment.

(1) DCT-II

If DCT-II is used to transform the to-be-transformed vector, the following formulas may be used to perform the to-be-transformed vector:

$$y_k = \sum_{n=0}^{N-1} \sqrt{\frac{2}{N}} \cos\left(\frac{\pi \times (n + 0.5) \times k}{N-1}\right) \times w_0 \times x_n, \text{ and}$$

$$w_0 = \begin{cases} 1/\sqrt{2} & k = 0 \\ 1 & \text{Others} \end{cases}$$

In the foregoing formulas, $k=0, 1, 2, \ldots,$ and $N-1$.

(2) DCT-VIII

If DCT-VIII is used to transform the to-be-transformed vector, the following formula may be used to perform calculation:

$$y_k = \sum_{n=0}^{N-1} \sqrt{\frac{2}{N+0.5}} \cos\left(\frac{\pi \times (n + 0.5) \times (k + 0.5)}{N + 0.5}\right) \times x_n$$

In the foregoing formula, $k=0, 1, 2, \ldots,$ and $N-1$.

(3) DST-VII

If DST-VII is used to transform the to-be-transformed vector, the following formula may be used to perform calculation:

$$y_k = \sum_{n=0}^{N-1} \sqrt{\frac{2}{N+0.5}} \sin\left(\frac{\pi \times (n + 1) \times (k + 0.5)}{N + 0.5}\right) \times x_n$$

In the foregoing formula, $k=0, 1, 2, \ldots,$ and $N-1$.

According to the transform method in picture block encoding provided in this embodiment of the present disclosure, the video encoding device determines, in the target transform set, the corresponding transform pair of each region of the at least two regions that constitute the to-be-encoded current block, and may transform each region based on the corresponding transform pair of each region to obtain the transform result of each region, and further obtain the transform result of the current block based on the transform result of each region and the position of each region in the current block. The video encoding device no longer needs to determine a final transform manner of the current block based on a rate-distortion cost. This is different from an existing multi-core transform technology, and can reduce complexity of encoding video data, and improve efficiency of encoding the video data.

Further, the video encoding device no longer needs to write, into a bitstream, indication information used to indicate to select which transform pair in a transform candidate set. This is different from the multi-core transform technology, and can reduce overheads of encoding the video data.

Further, the video encoding device partitions the current block to obtain a plurality of regions, and transforms the current block by transforming each region based on a transform pair corresponding to a position of the region. This can better adapt to a distribution feature of picture texture information, and improve a compression effect of the video data.

Optionally, in a video data encoding process, the video encoding device may obtain the transform result of the current block by partitioning the current block according to the foregoing method (the method described in S101 to S105). Alternatively, the video encoding device may not partition the current block, but directly transforms the current block to obtain the transform result of the current block. Then, the video encoding device may determine, based on encoding results (namely, encoded information) obtained by using the foregoing two transform methods, rate-distortion costs respectively corresponding to the two encoding results, and determine, based on the rate-distortion costs, to use which transform method to obtain encoded information as final encoded information.

Figure 11:
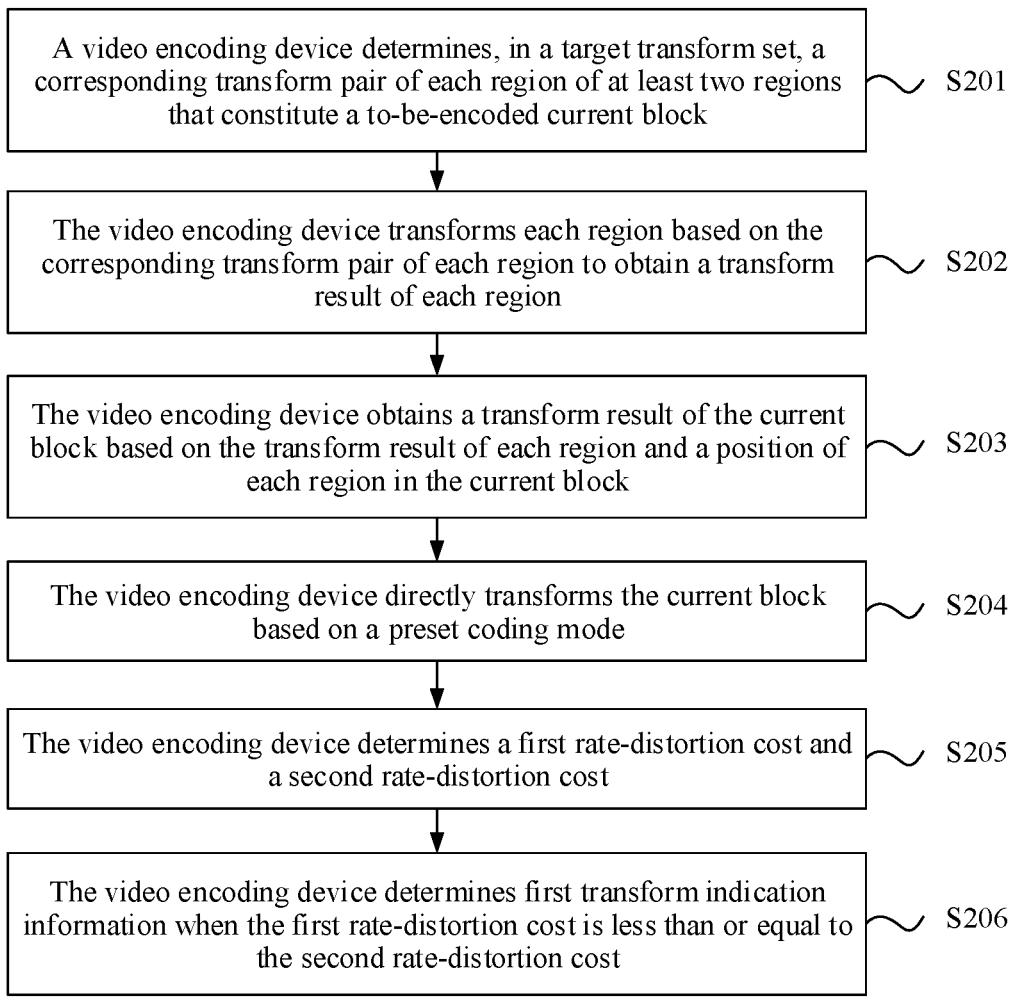
FIG. 11 is a fourth schematic diagram of a transform method in picture block encoding according to an embodiment of the present disclosure.

Specifically, as shown in FIG. 11, a transform method in picture block encoding provided in an embodiment of the present disclosure may include S201 to S206.

S201: A video encoding device determines, in a target transform set, a corresponding transform pair of each region of at least two regions that constitute a to-be-encoded current block.

S202: The video encoding device transforms each region based on the corresponding transform pair of each region to obtain a transform result of each region.

S203: The video encoding device obtains a transform result of the current block based on the transform result of each region and a position of each region in the current block.

For specific descriptions of S201 to S203, refer to related descriptions of S101 to S103 in the foregoing embodiment. Details are not described herein again.

S204: The video encoding device directly transforms the current block based on a preset coding mode.

In this embodiment of the present disclosure, that the video encoding device directly transforms the current block based on a preset coding mode means that the video encoding device directly transforms the current block without partitioning the current block. The preset coding mode may include a single-core transform technology and a multi-core transform technology. In the single-core transform technology, the current block includes one transform pair. For example, a horizontal transform core and a vertical transform core in the transform pair each may be DCT-II. In the multi-core transform technology, the current block includes a plurality of transform pairs. For example, there are four transform pairs, and horizontal transform cores and vertical transform cores of the four transform pairs are respectively: (DCT-VIII, DCT-VIII), (DST-VII, DCT-VIII), (DCT-VIII, DST-VII), and (DST-VII, DST-VII). The video encoding device may transform the current block separately based on the plurality of transform pairs, and then select an optimal transform pair based on a rate-distortion cost, and indicate the transform pair to a video decoding device.

It should be noted that a sequence of performing S201 to S203 and S204 may not be limited in this embodiment of the present disclosure. In other words, S201 to S203 may be performed before S204, or S204 may be performed before S201 to S203, or S201 to S203 and S204 may be simultaneously performed.

S205: The video encoding device determines a first rate-distortion cost and a second rate-distortion cost.

The first rate-distortion cost is a rate-distortion cost of the current block when the current block is transformed by region to obtain the transform result of the current block, and the second rate-distortion cost is a rate-distortion cost of the current block when the current block is directly transformed to obtain the transform result of the current block.

In this embodiment of the present disclosure, the video encoding device obtains the transform result of the current block by performing S201 to S203, to obtain encoded information of the current block. The video encoding device calculates the first rate-distortion cost of the current block based on the encoded information of the current block. In addition, the encoded information of the current block may be obtained based on the transform result that is of the current block and that is obtained in S204, and the video encoding device calculates the second rate-distortion cost of the current block based on the encoded information of the current block.

Specifically, the rate-distortion cost may be calculated by using the following formula:

$$J = D + \lambda * R$$

In the foregoing formula, J represents the rate-distortion cost, D is a parameter for measuring a difference between a reconstructed picture block and an original picture block, λ represents a Lagrange multiplier (λ may be a preset constant), and R is a parameter for measuring an encoding cost when a current coding mode is used (the encoding cost refers to an estimated quantity of bits occupied by an encoded bitstream of the current block).

S206: The video encoding device determines first transform indication information when the first rate-distortion cost is less than or equal to the second rate-distortion cost.

The first transform indication information is used to indicate, to the video decoding device, that the current block needs to be inverse transformed by region.

In this embodiment of the present disclosure, when the first rate-distortion cost is greater than the second rate-distortion cost, the first transform indication information is used to indicate, to the video decoding device, that the current block does not need to be inverse transformed by region.

Optionally, in this embodiment of the present disclosure, "0" may be used to indicate that the current block needs to be inverse transformed by region, or "1" may be used to indicate that the current block needs to be inverse transformed by region. Specifically, an appropriate identifier may be selected based on an actual situation to indicate that the current block needs to be inverse transformed by region. This is not limited in this embodiment of the present disclosure.

Similarly, "0" may be used to indicate that the current block does not need to be inverse transformed by region, or "1" may be used to indicate that the current block does not need to be inverse transformed by region. Specifically, an appropriate identifier may be selected based on an actual situation to indicate that the current block does not need to be inverse transformed by region. This is not limited in this embodiment of the present disclosure.

It should be noted that, in this embodiment of the present disclosure, if "1" is used to indicate that the current block needs to be inverse transformed by region, "0" may be used to indicate that the current block does not need to be inverse transformed by region.

In this embodiment of the present disclosure, after the video encoding device determines the first transform indication information, the video encoding device may write the first transform indication information into a bitstream corresponding to a bitstream layer at which the current block is located, to indicate, to the video decoding device, whether the current block needs to be inverse transformed by region.

In this embodiment of the present disclosure, the video encoding device transforms the current block by using the method described in S201 to S203, and transforms the current block by using the method described in S204. Then, the video encoding device may determine, based on the rate-distortion costs respectively corresponding to the two methods, a method that has a better encoding effect. Specifically, a smaller rate-distortion cost indicates a better encoding effect. In conclusion, video data is encoded according to the method for transforming the current block by region and the method for transforming the current block not by region. This can overall improve efficiency of encoding the video data.

Optionally, based on related descriptions of S201 to S206, when encoding the video data, the video encoding device may further write second transform indication information into a bitstream corresponding to a sequence layer, a picture layer, or a slice layer of the video data. The second transform indication information is used to indicate, to the video decoding device, whether the sequence layer, the picture layer, or the slice layer of the video data includes a to-be-encoded block that needs to be transformed by region.

For example, for a video frame of the video data, if the video encoding device determines that some of to-be-encoded blocks included in the video frame need to be transformed by region, the video encoding device writes second transform indication information into a picture header of a picture layer corresponding to the video frame. The second transform indication information is used to indicate that the picture layer includes a to-be-encoded block that needs to be transformed by region. If the video encoding device determines that none of the to-be-encoded blocks included in the video frame needs to be transformed by region, the video encoding device writes the second transform indication information into the picture header of the picture layer corresponding to the video frame. The second transform indication information is used to indicate that the picture layer does not include the to-be-encoded block that needs to be transformed by region.

When the video encoding device determines that none of the to-be-encoded blocks included in the video frame needs to be transformed by region, the video encoding device writes the second transform indication information into the picture header of the picture layer corresponding to the video frame, to indicate that the picture layer does not include the to-be-encoded block that needs to be transformed by region. In this case, the video encoding device no longer needs to write transform indication information into a bitstream corresponding to a bitstream layer at which each to-be-encoded block is located. This can reduce overheads required for encoding the video data.

Figure 12:
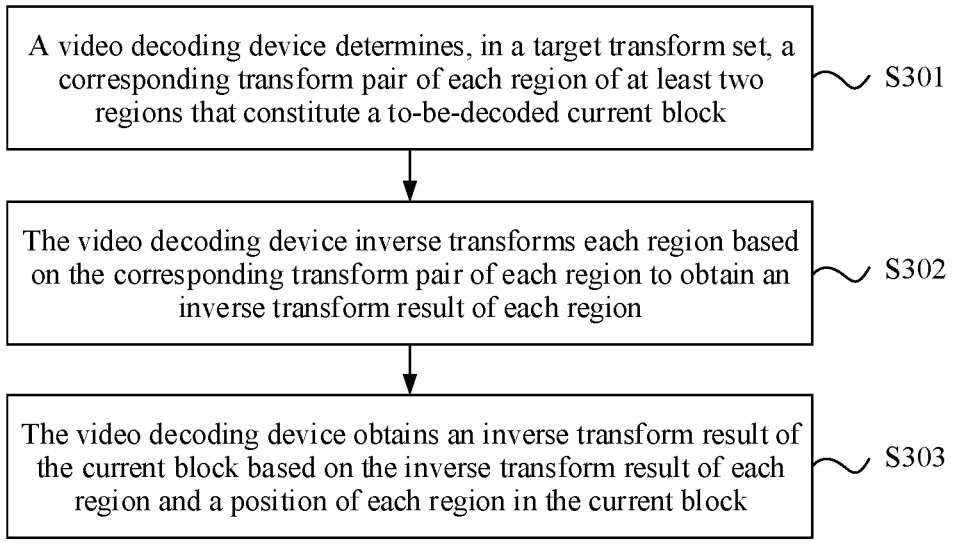
FIG. 12 is a first schematic diagram of an inverse transform method in picture block decoding according to an embodiment of the present disclosure.

For a video data decoding scenario, an inverse transform method in picture block decoding provided in an embodiment of the present disclosure is described by using a to-be-decoded current block (a picture block corresponding to the to-be-encoded current block) as an example. As shown in FIG. 12, the method may include S301 to S303.

S301: A video decoding device determines, in a target transform set, a corresponding transform pair of each region of at least two regions that constitute a to-be-decoded current block.

The at least two regions do not overlap each other, the target transform set includes a correspondence between a transform pair and a position of a region in the current block (in a video data decoding process below, the current block is the to-be-decoded current block), and the transform pair includes a horizontal transform core and a vertical transform core.

Optionally, in this embodiment of the present disclosure, at least two transform pairs included in the target transform set may be the same or different.

The at least two regions that constitute the to-be-decoded current block may be obtained in the following manner: performing, by the video decoding device, N-layer partitioning on the current block based on a preset partitioning mode to obtain the at least two regions.

$1 \leq N \leq N1$ and $N1$ is a maximum partitioning layer quantity. The preset partitioning mode includes at least one of the following partitioning modes: a quadtree partitioning mode, a binary tree partitioning mode, or a ternary tree partitioning mode.

Optionally, a method used by the video decoding device to perform N-layer partitioning on the current block based on the preset partitioning mode to obtain the at least two regions may include: determining, by the video decoding device, whether the current block meets a partitioning condition, where the partitioning condition is that a width of the current block is greater than a preset width threshold, or that a height of the current block is greater than a preset height threshold; and when determining that the current block meets the partitioning condition, performing, by the video decoding device, N-layer partitioning on the current block based on the preset partitioning mode to obtain the at least two regions.

Optionally, a method used by the video decoding device to perform N-layer partitioning on the current block based on the preset partitioning mode to obtain the at least two regions may alternatively include: parsing, by the video decoding device, a bitstream corresponding to a bitstream layer at which the current block is located, to obtain first transform indication information, where the first transform indication information is used to indicate whether the current block needs to be inverse transformed by region; and when the first transform indication information indicates that the current block needs to be inverse transformed by region, performing, by the video decoding device, N-layer partitioning on the current block based on the preset partitioning mode to obtain the at least two regions.

Optionally, a method used by the video decoding device to parse the bitstream corresponding to the bitstream layer at which the current block is located, to obtain the first transform indication information may include: parsing, by the video decoding device, a bitstream corresponding to a sequence layer, a picture layer, or a slice layer at which the current block is located, to obtain second transform indication information, where the second transform indication information is used to indicate whether the sequence layer, the picture layer, or the slice layer includes a to-be-decoded block that needs to be inverse transformed by region; and when the second transform indication information indicates that the sequence layer, the picture layer, or the slice layer includes the to-be-decoded block that needs to be inverse transformed by region, parsing the bitstream corresponding to the bitstream layer at which the current block is located, to obtain the first transform indication information.

S302: The video decoding device inverse transforms each region based on the corresponding transform pair of each region to obtain an inverse transform result of each region.

In this embodiment of the present disclosure, after the video decoding device determines the corresponding transform pair of each region of the at least two regions of the current block, based on the transform pair corresponding to a position of each region, the video decoding device performs horizontal inverse transform on each region by using the horizontal transform core in the transform pair, and performs vertical inverse transform on each region by using the vertical transform core in the transform pair.

One region of the current block is used as an example. A residual block (residual block obtained after inverse quantization) corresponding to the region is denoted as B. It is assumed that a horizontal transform core in a transform pair corresponding to the region is DST-VII and a vertical transform core in the transform pair corresponding to the region is DCT-VIII, where a transform matrix corresponding to DST-VII is X and a transform matrix corresponding to DCT-VIII is Y. An inverse transform result R' of the region B is:

$$R'=Y^T B X^T$$

In the foregoing formula, $Y^T$ is transpose of Y, and $X^T$ is transpose of X.

S303: The video decoding device obtains an inverse transform result of the current block based on the inverse transform result of each region and a position of each region in the current block.

The inverse transform result of the current block may be a prediction residual of the current block.

In this embodiment of the present disclosure, after the video decoding device obtains the inverse transform result of each region of the current block, the video decoding device may splice inverse transform results of all regions of the current block based on the position of each region in the current block to obtain the inverse transform result of the current block. Then, the video decoding device may obtain, based on the inverse transform result (namely, a reconstructed residual block) of the current lock and a prediction block of the current block, a reconstructed picture block corresponding to the current block.

It should be noted that the video data decoding process is an inverse process of the video data encoding process. The video encoding device encodes video data by using the method in S101 to S103, and the video decoding device decodes the video data by performing S301 to S303.

For specific descriptions of S301 to S303, refer to descriptions of S101 to S103. Details are not described herein again.

It should be noted that, the video decoding device parses the bitstream corresponding to the bitstream layer at which the current block is located, to obtain the first transform indication information, and if the first transform indication information indicates that the current block does not need to be inverse transformed by region, the video decoding device inverse transforms the current block directly by using the transform pair that is used by the video encoding device to transform the to-be-encoded current block. The video decoding device parses the bitstream corresponding to the sequence layer, the picture layer, or the slice layer at which the current block is located, to obtain the second transform indication information, and if the second transform indication information indicates that the sequence layer, the picture layer, or the slice layer does not include the to-be-decoded block that needs to be inverse transformed by region, the video decoding device inverse transforms all to-be-decoded blocks at the sequence layer, the picture layer, or the slice layer directly.

The inverse transform method in picture block decoding provided in this embodiment of the present disclosure is applied to the video data decoding scenario. The video decoding device may determine, in the target transform set, the corresponding transform pair of each region of the at least two regions that constitute the to-be-decoded current block, inverse transform each region based on the corresponding transform pair of each region to obtain the inverse transform result of each region, and further obtain the inverse transform result of the current block based on the inverse transform result of each region and the position of each region in the current block. Compared with a prior-art method in which the current block is inverse transformed directly, the inverse transform method can improve efficiency of decoding the video data, and improve quality of reconstructing a picture in the video data.

Optionally, before S301, the inverse transform method in picture block decoding provided in this embodiment of the present disclosure may further include S304 or S305.

Figure 13:
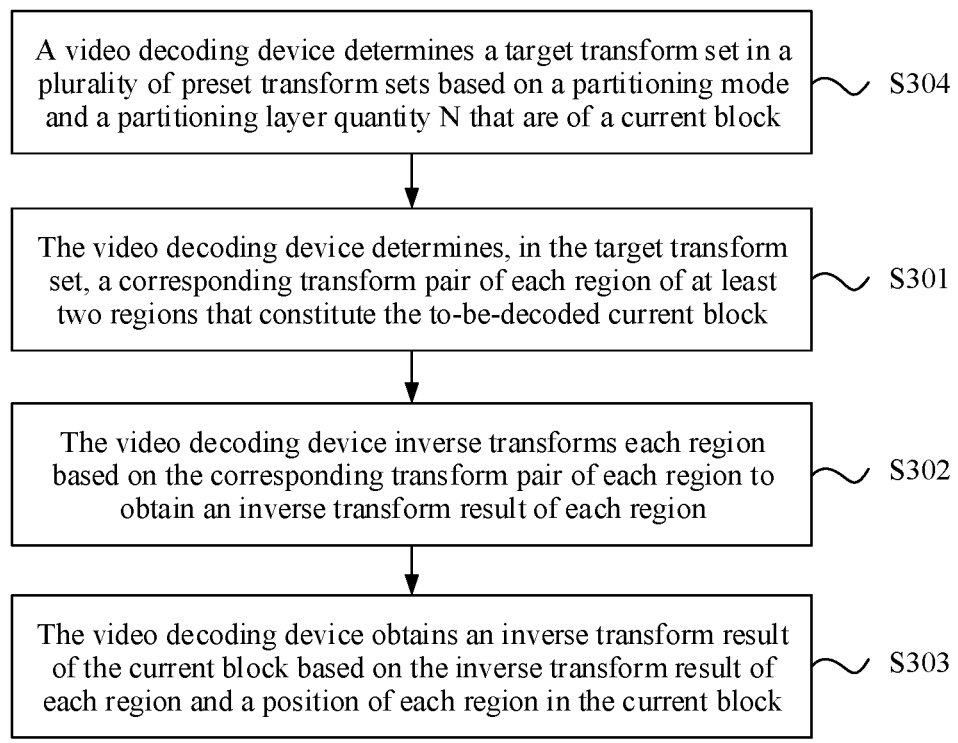
FIG. 13 is a second schematic diagram of an inverse transform method in picture block decoding according to an embodiment of the present disclosure.

Specifically, with reference to FIG. 12, as shown in FIG. 13, before S301, the inverse transform method in picture block decoding provided in this embodiment of the present disclosure may further include the following step:

S304: The video decoding device determines the target transform set in a plurality of preset transform sets based on the partitioning mode and the partitioning layer quantity N that are of the current block.

In this embodiment of the present disclosure, the partitioning mode of the current block is the quadtree partitioning mode, the partitioning layer quantity N of the current block is 1, and the at least two regions are specifically an upper-left corner region, an upper-right corner region, a lower-left corner region, and a lower-right corner region. Correspondingly, a transform pair that corresponds to the upper-left corner region and that is included in the target transform set includes: a horizontal transform core DCT-VIII and a vertical transform core DCT-VIII; a transform pair that corresponds to the upper-right corner region and that is included in the target transform set includes: a horizontal transform core DST-VII and a vertical transform core DCT-VIII; a transform pair that corresponds to the lower-left corner region and that is included in the target transform set includes: a horizontal transform core DCT-VIII and a vertical transform core DST-VII; and a transform pair that corresponds to the lower-right corner region and that is included in the target transform set includes: a horizontal transform core DST-VII and a vertical transform core DST-VII.

Figure 14:
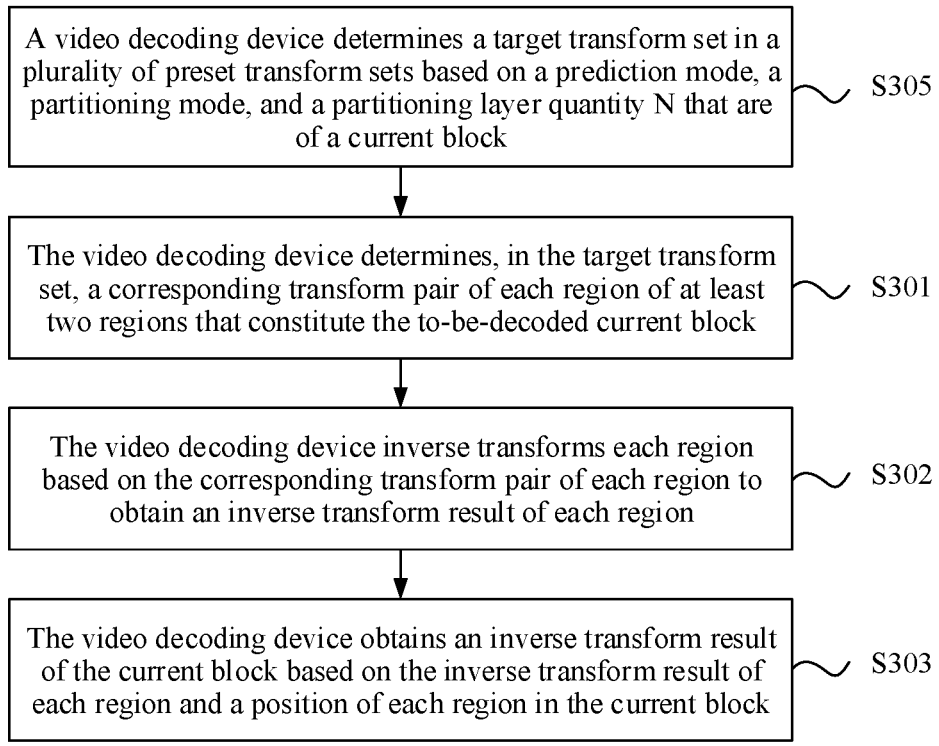
FIG. 14 is a third schematic diagram of an inverse transform method in picture block decoding according to an embodiment of the present disclosure.

With reference to FIG. 12, as shown in FIG. 14, before S301, the inverse transform method in picture block decoding provided in this embodiment of the present disclosure may further include the following step:

S305: The video decoding device determines the target transform set in a plurality of preset transform sets based on a prediction mode, the partitioning mode, and the partitioning layer quantity N that are of the current block.

For specific descriptions of S304 and S305, refer to related descriptions of S104 and S105 (namely, the video encoding device determines the target transform set) in the foregoing embodiment. Details are not described herein again.

The foregoing mainly describes, from a perspective of network elements, the solutions provided in the embodiments of the present disclosure. It may be understood that, to implement the foregoing functions, the network elements such as the video encoding device and the video decoding device include corresponding hardware structures and/or software modules that perform the functions. A person of ordinary skill in the art should easily be aware that, in combination with the examples described in the embodiments disclosed in this specification, units, algorithms, and steps may be implemented by hardware or a combination of hardware and computer software in the embodiments of the present disclosure. Whether a function is performed by hardware or hardware driven by computer software depends on particular disclosures and design constraints of the technical solutions. A person skilled in the art may use different methods to implement the described functions for each particular disclosure, but it should not be considered that the implementation goes beyond the scope of this disclosure.

In the embodiments of the present disclosure, the video encoding device, the video decoding device, and the like may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of the present disclosure, module division is an example, and is merely a logical function division. In actual implementation, another division manner may be used.

Figure 15:
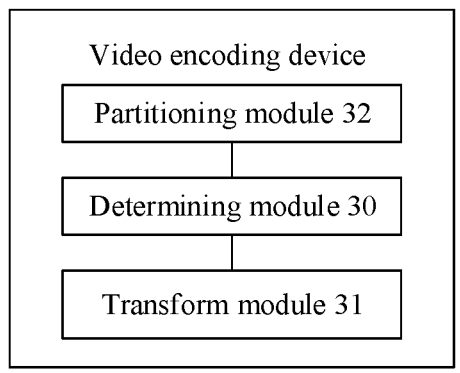
FIG. 15 is a first schematic structural diagram of a video encoding device according to an embodiment of the present disclosure.

When each functional module is obtained through division based on a corresponding function, FIG. 15 is a possible schematic structural diagram of a video encoding device in the foregoing embodiments. As shown in FIG. 15, the video encoding device may include a determining module 30 and a transform module 31. The determining module 30 may be configured to support the video encoding device to perform S101, S104, S105, S201, S205, and S206 in the foregoing method embodiments. The transform module 31 may be configured to support the video encoding device to perform S102, S103, S202, S203, and S204 in the foregoing method embodiments. Optionally, as shown in FIG. 15, the video encoding device may further include a partitioning module 32. The partitioning module 32 may support the video encoding device to partition a current block to obtain at least two regions that constitute the current block. All related content of the steps in the foregoing method embodiments may be cited in function descriptions of corresponding functional modules. Details are not described herein again.

Figure 16:
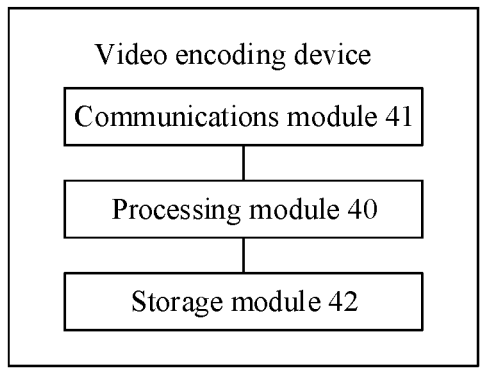
FIG. 16 is a second schematic structural diagram of a video encoding device according to an embodiment of the present disclosure.

When an integrated unit is used, FIG. 16 is a possible schematic structural diagram of a video encoding device in the foregoing embodiments. As shown in FIG. 16, the video encoding device may include a processing module 40 and a communications module 41. The processing module 40 may be configured to control and manage an action of the video encoding device. The processing module 40 may be configured to support the video encoding device to perform S101 to S105 and S201 to S206 in the foregoing method embodiments, and/or may be used in another process of the technology described in this specification. The communications module 41 may be configured to support the video encoding device in communicating with another network entity. Optionally, as shown in FIG. 16, the video encoding device may further include a storage module 42, configured to store program code and data of the video encoding device.

The processing module 40 may be a processor or a controller (for example, may be the video encoder 12 shown in FIG. 4), for example, may be a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the embodiments of the present disclosure. The processor may be a combination for implementing a computing function, for example, a combination including one or more microprocessors, or a combination of a DSP and a microprocessor. The communications module 41 may be a transceiver, a transceiver circuit, a communications interface, or the like (for example, may be the output interface 13 shown in FIG. 4). The storage module 42 may be a memory (for example, may be the memory 11 shown in FIG. 4).

When the processing module 40 is the processor, the communications module 41 is the transceiver, and the storage module 42 is the memory, the processor, the transceiver, and the memory may be connected through a bus. The bus may be a peripheral component interconnect (PCI) bus, an extended industry standard architecture (EISA) bus, or the like. The bus may be classified into an address bus, a data bus, a control bus, and the like.

Figure 17:
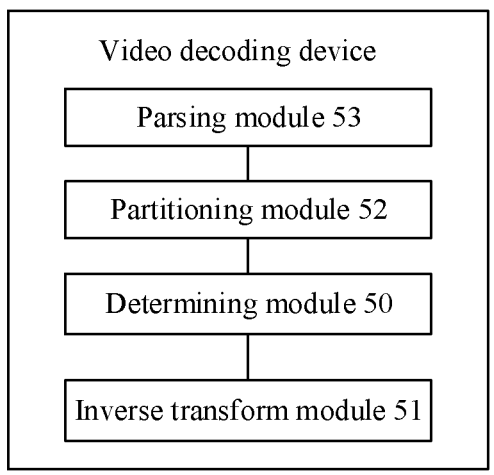
FIG. 17 is a first schematic structural diagram of a video decoding device according to an embodiment of the present disclosure.

When each functional module is obtained through division based on a corresponding function, FIG. 17 is a possible schematic structural diagram of a video decoding device in the foregoing embodiments. As shown in FIG. 17, the video decoding device may include a determining module 50 and an inverse transform module 51. The determining module 50 may be configured to support the video decoding device to perform S301, S304, and S305 in the foregoing method embodiment. The inverse transform module 51 may be configured to support the video decoding device to perform S302 in the foregoing method embodiment. Optionally, as shown in FIG. 17, the video decoding device may further include a partitioning module 52 and a parsing module 53. The partitioning module 52 may be configured to support the video decoding device to partition a current block to obtain at least two regions that constitute the current block. The parsing module 53 may be configured to support the video decoding device to parse a bitstream corresponding to a bitstream layer at which the current block is located, to obtain first transform indication information, or support the video decoding device to parse a bitstream corresponding to a sequence layer, a picture layer, or a slice layer at which the current block is located, to obtain second transform indication information. All related content of the steps in the foregoing method embodiments may be cited in function descriptions of corresponding functional modules. Details are not described herein again.

Figure 18:
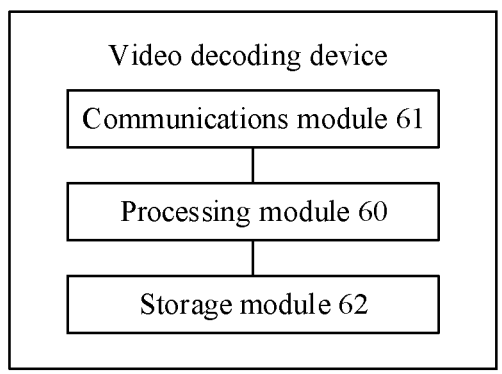
FIG. 18 is a second schematic structural diagram of a video decoding device according to an embodiment of the present disclosure.

When an integrated unit is used, FIG. 18 is a possible schematic structural diagram of a video decoding device in the foregoing embodiments. As shown in FIG. 18, the video decoding device may include a processing module 60 and a communications module 61. The processing module 60 may be configured to control and manage an action of the video decoding device. The processing module 60 may be configured to support the video decoding device to perform S301 to S305 in the foregoing method embodiment, and/or may be used in another process of the technology described in this specification. The communications module 61 may be configured to support the video decoding device in communicating with another network entity. Optionally, as shown in FIG. 18, the video decoding device may further include a storage module 62, configured to store program code and data of the video decoding device.

The processing module 60 may be a processor or a controller (for example, may be the video decoder 21 shown in FIG. 5), for example, may be a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the embodiments of the present disclosure. The processor may be a combination for implementing a computing function, for example, a combination including one or more microprocessors, or a combination of a DSP and a microprocessor. The communications module 61 may be a transceiver, a transceiver circuit, a communications interface, or the like (for example, may be the input interface 20 shown in FIG. 5). The memory module 62 may be a memory.

When the processing module 60 is the processor, the communications module 61 is the transceiver, and the storage module 62 is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on a computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

The foregoing descriptions about the implementations allow a person skilled in the art to clearly understand that, for the purpose of convenient and brief description, division of the foregoing functional modules is taken as an example for illustration. In actual disclosure, the foregoing functions can be allocated to different functional modules and implemented based on a requirement, that is, an inner structure of an apparatus is divided into different functional modules to implement all or some of the functions described above. For detailed working processes of the foregoing system, apparatus, and unit, refer to corresponding processes in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes: any medium that can store program code, such as a flash memory, a removable hard disk, a read-only memory, a random access memory, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. An inverse transform method in picture block decoding, wherein the method is applied in a video decoding device, and comprises:
    determining, in a target transform set, a corresponding transform pair of each region of at least two regions that constitute a to-be-decoded current block, wherein the at least two regions do not overlap each other, the target transform set comprises a correspondence between a transform pair and a position of a region in the current block, and the transform pair comprises a horizontal transform core and a vertical transform core;
    inverse transforming each region of the at least two regions based on the corresponding transform pair of each region of the at least two regions to obtain an inverse transform result of each region of the at least two regions; and
    obtaining an inverse transform result of the current block based on the inverse transform result of each region of the at least two regions and a position of each region of the at least two regions in the current block.

2. The method according to claim 1, wherein the at least two regions are obtained in the following manner:
    performing N-layer partitioning on the current block based on a preset partitioning mode to obtain the at least two regions, wherein $1 \leq N \leq N1$, N1 is a maximum partitioning layer quantity, and the preset partitioning mode comprises at least one of the following partitioning modes: a quadtree partitioning mode, a binary tree partitioning mode, or a ternary tree partitioning mode.

3. The method according to claim 1, wherein before the determining, in a target transform set, a corresponding transform pair of each region of at least two regions that constitute a to-be-decoded current block, the method further comprises:

determining the target transform set in a plurality of preset transform sets based on the partitioning mode and the partitioning layer quantity N that are of the current block.

4. The method according to claim 3, wherein the partitioning mode of the current block is the quadtree partitioning mode, the partitioning layer quantity N of the current block is 1, and the at least two regions are an upper-left corner region, an upper-right corner region, a lower-left corner region, and a lower-right corner region;

correspondingly, a transform pair that corresponds to the upper-left corner region and that is comprised in the target transform set comprises: a horizontal transform core DCT-VIII and a vertical transform core DCT-VIII;

a transform pair that corresponds to the upper-right corner region and that is comprised in the target transform set comprises: a horizontal transform core DST-VII and a vertical transform core DCT-VIII;

a transform pair that corresponds to the lower-left corner region and that is comprised in the target transform set comprises: a horizontal transform core DCT-VIII and a vertical transform core DST-VII; and a transform pair that corresponds to the lower-right corner region and that is comprised in the target transform set comprises: a horizontal transform core DST-VII and a vertical transform core DST-VII.

5. The method according to claim 1, wherein before the determining, in a target transform set, a corresponding transform pair of each region of at least two regions that constitute a to-be-decoded current block, the method further comprises:

determining the target transform set in a plurality of preset transform sets based on a prediction mode, the partitioning mode, and the partitioning layer quantity N that are of the current block.

6. The method according to claim 2, wherein the performing N-layer partitioning on the current block based on a preset partitioning mode to obtain the at least two regions comprises:

determining whether the current block meets a partitioning condition, wherein the partitioning condition is that a width of the current block is greater than a preset width threshold, or that a height of the current block is greater than a preset height threshold; and when determining that the current block meets the partitioning condition, performing N-layer partitioning on the current block based on the preset partitioning mode to obtain the at least two regions.

7. The method according to claim 2, wherein the performing N-layer partitioning on the current block based on a preset partitioning mode to obtain the at least two regions comprises:

parsing a bitstream corresponding to a bitstream layer at which the current block is located, to obtain first transform indication information, wherein the first transform indication information is used to indicate whether the current block needs to be inverse transformed by region; and when the first transform indication information indicates that the current block needs to be inverse transformed by region, performing N-layer partitioning on the current block based on the preset partitioning mode to obtain the at least two regions.

8. The method according to claim 7, wherein the parsing a bitstream corresponding to a bitstream layer at which the current block is located, to obtain first transform indication information, comprises:

parsing a bitstream corresponding to a sequence layer, a picture layer, or a slice layer at which the current block is located, to obtain second transform indication information, wherein the second transform indication information is used to indicate whether the sequence layer, the picture layer, or the slice layer comprises a to-be-decoded block that needs to be inverse transformed by region; and when the second transform indication information indicates that the sequence layer, the picture layer, or the slice layer comprises the to-be-decoded block that needs to be inverse transformed by region, parsing the bitstream corresponding to the bitstream layer at which the current block is located, to obtain the first transform indication information.

9. A video decoding device, comprising a one or more processors configured to:

determine, in a target transform set, a corresponding transform pair of each region of at least two regions that constitute a to-be-decoded current block, wherein the at least two regions do not overlap each other, the target transform set comprises a correspondence between a transform pair and a position of a region in the current block, and the transform pair comprises a horizontal transform core and a vertical transform core; and inverse transform each region of the at least two regions based on the corresponding transform pair of each region of the at least two regions to obtain an inverse transform result of each region of the at least two regions; and obtain an inverse transform result of the current block based on the inverse transform result of each region of the at least two regions and a position of each region of the at least two regions in the current block.

10. The video decoding device according to claim 9, wherein the one or more processors are further configured to perform N-layer partitioning on the current block based on a preset partitioning mode to obtain the at least two regions, wherein 1≤N≤N1, N1 is a maximum partitioning layer quantity, and the preset partitioning mode comprises at least one of the following partitioning modes: a quadtree partitioning mode, a binary tree partitioning mode, or a ternary tree partitioning mode.

11. The video decoding device according to claim 9, wherein the one or more processors are further configured to: before determining, in the target transform set, the corresponding transform pair of each region of the at least two regions that constitute the to-be-decoded current block, determine the target transform set in a plurality of preset transform sets based on the partitioning mode and the partitioning layer quantity N that are of the current block.

12. The video decoding device according to claim 11, wherein the partitioning mode of the current block is the quadtree partitioning mode, the partitioning layer quantity N of the current block is 1, and the at least two regions are an upper-left corner region, an upper-right corner region, a lower-left corner region, and a lower-right corner region;

correspondingly, a transform pair that corresponds to the upper-left corner region and that is comprised in the target transform set comprises: a horizontal transform core DCT-VIII and a vertical transform core DCT-VIII;

a transform pair that corresponds to the upper-right corner region and that is comprised in the target transform set comprises: a horizontal transform core DST-VII and a vertical transform core DCT-VIII;

a transform pair that corresponds to the lower-left corner region and that is comprised in the target transform set comprises: a horizontal transform core DCT-VIII and a vertical transform core DST-VII; and a transform pair that corresponds to the lower-right corner region and that is comprised in the target transform set comprises: a horizontal transform core DST-VII and a vertical transform core DST-VII.

13. The video decoding device according to claim 9, wherein the one or more processors are further configured to: before determining, in the target transform set, the corresponding transform pair of each region of the at least two regions that constitute the to-be-decoded current block, determine the target transform set in a plurality of preset transform sets based on a prediction mode, the partitioning mode, and the partitioning layer quantity N that are of the current block.

14. The video decoding device according to claim 10, wherein the one or more processors are further configured to determine whether the current block meets a partitioning condition, wherein the partitioning condition is that a width of the current block is greater than a preset width threshold, or that a height of the current block is greater than a preset height threshold; and when it is determined that the current block meets the partitioning condition, perform N-layer partitioning on the current block based on the preset partitioning mode to obtain the at least two regions.

15. The video decoding device according to claim 10, wherein the one or more processors are configured to parse a bitstream corresponding to a bitstream layer at which the current block is located, to obtain first transform indication information, wherein the first transform indication information is used to indicate whether the current block needs to be inverse transformed by region; and when the first transform indication information indicates that the current block needs to be inverse transformed by region, perform N-layer partitioning on the current block based on the preset partitioning mode to obtain the at least two regions.

16. The video decoding device according to claim 15, wherein the one or more processors are configured to: parse a bitstream corresponding to a sequence layer, a picture layer, or a slice layer at which the current block is located, to obtain second transform indication information, wherein the second transform indication information is used to indicate whether the sequence layer, the picture layer, or the slice layer comprises a to-be-decoded block that needs to be inverse transformed by region; and when the second transform indication information indicates that the sequence layer, the picture layer, or the slice layer comprises the to-be-decoded block that needs to be inverse transformed by region, parse the bitstream corresponding to the bitstream layer at which the current block is located, to obtain the first transform indication information.

17. A video encoding device, comprising one or more processors configured to:

determine, in a target transform set, a corresponding transform pair of each region of at least two regions that constitute a to-be-encoded current block, wherein the at least two regions do not overlap each other, the target transform set comprises a correspondence between a transform pair and a position of a region in the current block, and the transform pair comprises a horizontal transform core and a vertical transform core; and transform each region of the at least two regions based on the corresponding transform pair of each region of the at least two regions to obtain a transform result of each region of the at least two regions; and obtain a transform result of the current block based on the transform result of each region of the at least two regions and a position of each region of the at least two regions in the current block.

18. The video encoding device according to claim 17, wherein the one or more processors are configured to perform N-layer partitioning on the current block based on a preset partitioning mode to obtain the at least two regions, wherein $1 \leq N \leq N1$, N1 is a maximum partitioning layer quantity, and the preset partitioning mode comprises at least one of the following partitioning modes: a quadtree partitioning mode, a binary tree partitioning mode, or a ternary tree partitioning mode.

19. The video encoding device according to claim 18, wherein the one or more processors are further configured to: determine a first rate-distortion cost and a second rate-distortion cost, wherein the first rate-distortion cost is a rate-distortion cost of the current block when the current block is transformed by region to obtain the transform result of the current block, and the second rate-distortion cost is a rate-distortion cost of the current block when the current block is directly transformed to obtain the transform result of the current block; and determine transform indication information when the first rate-distortion cost is less than or equal to the second rate-distortion cost, wherein the transform indication information is used to indicate, to a video decoding device, that the current block needs to be inverse transformed by region.

20. The video encoding device according to claim 19, wherein when the first rate-distortion cost is greater than the second rate-distortion cost, the transform indication information is used to indicate, to the video decoding device, that the current block does not need to be inverse transformed by region.

* * * * *